(12) United States Patent
Yamamoto

(10) Patent No.: US 12,499,258 B2
(45) Date of Patent: Dec. 16, 2025

(54) CONFIRMATION SCREEN CREATION BASED ON OBTAINING TARGET DATA

(71) Applicant: Sumitomo Electric Industries, Ltd., Osaka (JP)

(72) Inventor: Takashi Yamamoto, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 235 days.

(21) Appl. No.: 17/601,932

(22) PCT Filed: Mar. 24, 2020

(86) PCT No.: PCT/JP2020/012866
§ 371 (c)(1),
(2) Date: Oct. 7, 2021

(87) PCT Pub. No.: WO2020/209045
PCT Pub. Date: Oct. 15, 2020

(65) Prior Publication Data
US 2022/0138341 A1 May 5, 2022

(30) Foreign Application Priority Data
Apr. 12, 2019 (JP) ................. 2019-076412

(51) Int. Cl.
*G06F 21/62* (2013.01)
*G06F 16/26* (2019.01)

(52) U.S. Cl.
CPC .......... *G06F 21/6218* (2013.01); *G06F 16/26* (2019.01)

(58) Field of Classification Search
CPC ............................ G06F 16/26; G06F 21/6218
(Continued)

(56) References Cited

U.S. PATENT DOCUMENTS 6,912,563 B1 * 6/2005 Parker ............... H04L 9/40
709/227
11,315,080 B1 * 4/2022 Shilovitsky ........... G06F 16/219
(Continued)

FOREIGN PATENT DOCUMENTS

CN 101551662 A 10/2009
CN 102693247 A 9/2012
(Continued)

OTHER PUBLICATIONS

Office Action issued Nov. 4, 2022 in related U.S. Appl. No. 17/602,779.
(Continued)

*Primary Examiner* — David P Zarka
(74) *Attorney, Agent, or Firm* — XSENSUS LLP

(57) ABSTRACT

A data visualization apparatus includes a data obtaining unit that obtains, from a database, target data that is at least one of measurement data or a calculation result of calculation using the measurement data and also that obtains identification information of a user, an authorization unit that grants, based on the identification information of the user, authority to perform access processing that is at least one of processing of obtaining the measurement data from the database or processing of performing calculation using the measurement data in the database to a processing unit, and the processing unit that performs, based on the target data obtained by the authority via the data obtaining unit, processing of creating a confirmation screen including the measurement data or the calculation result and processing of causing a display to display the confirmation screen.

20 Claims, 24 Drawing Sheets

(58) Field of Classification Search
USPC .......................................................... 726/28
See application file for complete search history.

(56) References Cited

U.S. PATENT DOCUMENTS

| | | | | |
|---|---|---|---|---|
| 2003/0037255 | A1* | 2/2003 | Yoshino | G01D 9/007 |
| | | | | 705/51 |
| 2005/0010128 | A1* | 1/2005 | Shiraishi | G01N 33/76 |
| | | | | 600/551 |
| 2005/0066304 | A1 | 3/2005 | Tattrie et al. | |
| 2005/0155043 | A1 | 7/2005 | Schulz et al. | |
| 2008/0238666 | A1* | 10/2008 | Loncar | G16H 70/40 |
| | | | | 715/810 |
| 2008/0263150 | A1* | 10/2008 | Childers | H04L 41/0853 |
| | | | | 709/203 |
| 2012/0110653 | A1* | 5/2012 | Feng | G06F 21/81 |
| | | | | 726/7 |
| 2012/0167041 | A1* | 6/2012 | Payzer | G06F 21/6209 |
| | | | | 717/113 |
| 2013/0167249 | A1* | 6/2013 | Birtwhistle | G16H 10/60 |
| | | | | 726/28 |
| 2013/0324119 | A1* | 12/2013 | Shi | H04W 36/0094 |
| | | | | 455/434 |
| 2014/0142396 | A1* | 5/2014 | Ricks | G16H 40/67 |
| | | | | 600/301 |
| 2016/0219054 | A1* | 7/2016 | Nagata | G06F 21/445 |
| 2016/0323262 | A1* | 11/2016 | Tan | G06F 21/10 |
| 2017/0277829 | A1* | 9/2017 | Weggler | G05B 23/0237 |
| 2017/0316155 | A1* | 11/2017 | Fairbairn | H04N 7/185 |
| 2017/0346705 | A1* | 11/2017 | Szilagyi | H04L 43/12 |
| 2019/0005488 | A1* | 1/2019 | Dietrich | G06Q 20/354 |
| 2019/0076064 | A1* | 3/2019 | Tahara | A61B 5/1176 |
| 2019/0340547 | A1* | 11/2019 | Maeda | G06Q 10/06 |
| 2020/0029165 | A1* | 1/2020 | Kumar | G01S 5/10 |
| 2020/0300912 | A1* | 9/2020 | Armagost | G01R 31/31905 |

FOREIGN PATENT DOCUMENTS

| | | |
|---|---|---|
| CN | 108415697 A | 8/2018 |
| CN | 108563666 A | 9/2018 |
| CN | 109358851 A | 2/2019 |
| JP | 2003-242034 A | 8/2003 |
| JP | 2003-256977 A | 9/2003 |
| JP | 2009-176224 A | 8/2009 |
| JP | 2016-134137 A | 7/2016 |
| JP | 2019-003691 A | 1/2019 |
| JP | 2019-020247 A | 2/2019 |
| WO | 2018/138760 A1 | 8/2018 |

OTHER PUBLICATIONS

Office Action issued May 2, 2023 in related U.S. Appl. No. 17/602,779.

Office Action issued Aug. 17, 2023 in related U.S. Appl. No. 17/602,779.

Office Action issued Feb. 12, 2024 in related U.S. Appl. No. 17/602,779.

Office Action issued Jun. 18, 2024 in related U.S. Appl. No. 17/602,779.

* cited by examiner

FIG.2

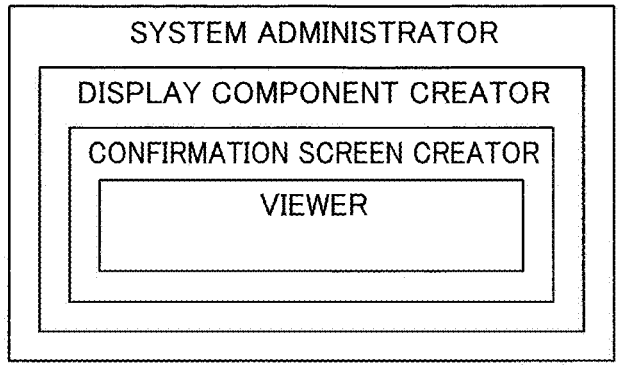

FIG.3

|  | SYSTEM ADMINISTRATOR | DISPLAY COMPONENT CREATOR | CONFIRMATION SCREEN CREATOR | VIEWER |
|---|---|---|---|---|
| USER MANAGEMENT PROCESSING | OK | NG | NG | NG |
| PROCESSING OF CREATING DISPLAY COMPONENTS | OK | OK | NG | NG |
| EDIT OF DISPLAY COMPONENTS | OK | OK | OK | NG |
| VIEWING DISPLAY COMPONENTS | OK | OK | OK | OK |
| PROCESSING OF CREATING CONFIRMATION SCREEN | OK | OK | OK | NG |
| VIEWING CONFIRMATION SCREEN | OK | OK | OK | OK |

FIG.4

|  | SYSTEM ADMINISTRATOR | DISPLAY COMPONENT CREATOR | CONFIRMATION SCREEN CREATOR | VIEWER |
|---|---|---|---|---|
| USER MANAGEMENT PROCESSING | OK | NG | NG | NG |
| PROCESSING OF CREATING DISPLAY COMPONENTS | OK | OK | NG | NG |
| EDIT OF DISPLAY COMPONENTS | OK | OK | NG | NG |
| VIEWING DISPLAY COMPONENTS | OK | OK | OK | NG |
| PROCESSING OF CREATING CONFIRMATION SCREEN | OK | OK | OK | NG |
| VIEWING CONFIRMATION SCREEN | OK | OK | OK | NG |

FIG.5 r11

CONFIRMATION SCREEN VIEW

[ADD] B3

Tab1

| SCREEN NAME | CONTENT | DETAIL VIEW |
|---|---|---|
| CONFIRMATION SCREEN 1 | ROOM CONDITION | DETAIL⇒ |
| CONFIRMATION SCREEN 2 | OPERATING TIME MANAGEMENT | DETAIL⇒ |

B1 r12

DISPLAY COMPONENT VIEW

[ADD] B4

Tab2

| DISPLAY COMPONENT NAME | TYPE | DETAIL VIEW |
|---|---|---|
| GRAPH G1 | LINE GRAPH | DETAIL⇒ |
| ANDON AN | ANDON | DETAIL⇒ |

B2

| | RELATIVE HUMIDITY | | | | | WBGT TABLE |
|---|---|---|---|---|---|---|
| | | 20% | 40% | 60% | 80% | 100% |
| TEMPERATURE | 40°C | 29 | 33 | 36 | 40 | 44 |
| | 35°C | 25 | 29 | 30 | 35 | 38 |
| | 30°C | 21 | 25 | 26 | 30 | 33 |
| | 25°C | 18 | 20 | 23 | 25 | 28 |
| | 21°C | 15 | 17 | 19 | 21 | 25 |

| HEAT STRESS INDEX | CAUTION < 25 | WARNING 25~28 | SEVERE WARNING 29~31 | DANGER ≥ 32 |
|---|---|---|---|---|

FIG.23

| CHANGE OF DISPLAY PERIOD | PRODUCT TYPE SELECTION | COMPONENT NAME SELECTION | ITEM NAME SELECTION | | |
|---|---|---|---|---|---|
| From: 2018-11-29  To: 2018-12-01  [CHANGE] | PRODUCT TYPE  PRODUCT TYPE 1  PRODUCT TYPE 2  PRODUCT TYPE 3 | COMPONENT NAME  COMPONENT 1  COMPONENT 2 | ITEM | THRESHOLD 0 | THRESHOLD 1 |
| | | | CURRENT | 13 | 15 |
| | | | POWER | 0.13 | 0.15 |

CONFIRMATION SCREEN CREATION BASED ON OBTAINING TARGET DATA

CROSS-REFERENCE TO RELATED APPLICATIONS

The present application is based on PCT filing PCT/JP2020/012866, filed Mar. 24, 2020, which claims priority to 2019-076412, filed on Apr. 12, 2019, the entire contents of each are incorporated herein by reference.

TECHNICAL FIELD

The present disclosure relates to a data visualization apparatus, a data processing method, and a data processing program.

BACKGROUND ART

Japanese Patent Application Laid-Open No. 2019-003691 (PTL 1) discloses the following technique. That is, a management apparatus includes: a first obtaining unit that obtains a measurement result by a sensor performing measurement for a facility and a time corresponding to the measurement result; a second obtaining unit that obtains a plurality of use periods of the facility and contents of management items corresponding to each of the use periods from a storage unit; and a data processing unit that performs processing of summarizing measurement information based on the measurement result for each of the contents, based on the measurement result and the corresponding time obtained by the first obtaining unit, and the contents and the corresponding use periods obtained by the second obtaining unit.

CITATION LIST

Patent Literature

PTL 1: Japanese Patent Application Laid-Open No. 2019-3691

SUMMARY OF INVENTION

A data visualization apparatus according to the present disclosure includes a data obtaining unit that obtains, from a database, target data that is at least one of measurement data or a calculation result of calculation using the measurement data and also obtains identification information of a user, an authorization unit that grants, based on the identification information of the user, authority to perform access processing that is at least one of processing of obtaining the measurement data from the database or processing of performing calculation using the measurement data in the database to a processing unit, and the processing unit that performs, based on the target data obtained by the authority via the data obtaining unit, processing of creating a confirmation screen including the measurement data or the calculation result and processing of causing a display to display the confirmation screen.

A data processing method according to the present disclosure is a data processing method for a data visualization apparatus, wherein the data processing method includes obtaining, from a database, target data that is at least one of measurement data or a calculation result of calculation using the measurement data and also obtaining identification information of a user, setting, based on the identification information of the user, authority to perform access processing that is at least one of processing of obtaining the measurement data from the database or processing of performing calculation using the measurement data in the database, and performing, based on the target data obtained by the authority, processing of creating a confirmation screen including the measurement data or the calculation result and processing of causing a display to display the confirmation screen.

A data processing program according to the present disclosure is a data processing program used in a data visualization apparatus, wherein the data processing program causes a computer to obtain, from a database, target data that is at least one of measurement data or a calculation result of calculation using the measurement data and also obtain identification information of a user, set, based on the identification information of the user, authority to perform access processing that is at least one of processing of obtaining the measurement data from the database or processing of performing calculation using the measurement data in the database, and perform, based on the target data obtained by the authority via the data obtaining unit, processing of creating a confirmation screen including the measurement data or the calculation result and processing of causing a display to display the confirmation screen.

An embodiment according to the present disclosure can be implemented not only as a data visualization apparatus including such characteristic processing units, but also as a semiconductor integrated circuit that implements a part or all of the data visualization apparatus, or as a system including the data visualization apparatus.

BRIEF DESCRIPTION OF DRAWINGS

FIG. 2 is a diagram illustrating an example of a type and a range of authority of a user in the management system according to the embodiment of the present disclosure.

FIG. 3 is a diagram illustrating an example of possible processing for each user type in the management system according to the embodiment of the present disclosure.

FIG. 4 is a diagram illustrating another example of possible processing for each user type in the management system according to the embodiment of the present disclosure.

FIG. 5 is a diagram illustrating an example of a top screen displayed on a display in the management system according to the embodiment of the present disclosure.

FIG. 23 is a diagram illustrating an example of a layout screen on which a plurality of types of display components are disposed in the management system according to the embodiment of the present disclosure.

DETAILED DESCRIPTION

Figure 1:
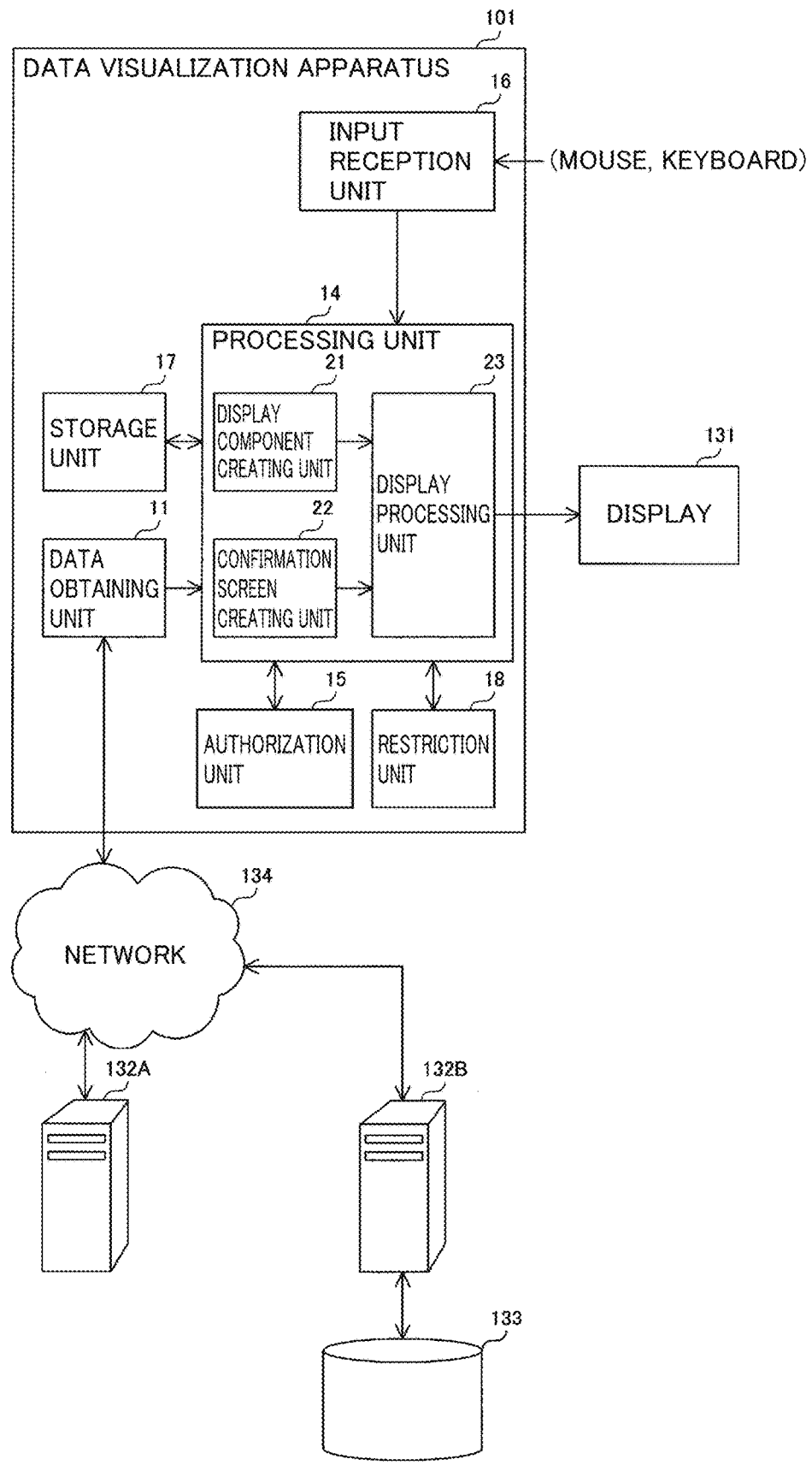
FIG. 1 is a diagram illustrating a configuration of a management system according to an embodiment of the present disclosure.

Conventionally, a technique for monitoring the state of a facility using a measurement result of a sensor has been developed.

Problems to be Solved by Present Disclosure

In the system including the above-described management apparatus, it is considered that the measurement result by the sensor, the measurement information based on the measurement result, and the like are stored in a database provided outside the management apparatus.

In order to use the database, a user needs to change the description of a database language such as SQL. Depending on the description of the SQL, the processing load on the database side increases.

However, only a limited number of people have knowledge about the database, and it is not easy for people who do not have sufficient expert knowledge about the database to smoothly use the database using the database language.

The present disclosure is made to solve the above-mentioned problem, an object of which is to provide a data visualization apparatus, a data processing method, and a data processing program that enable a smoother use of a database.

Advantageous Effects of Present Disclosure

According to the present disclosure, the database can be used more smoothly.

DESCRIPTION OF EMBODIMENTS OF PRESENT DISCLOSURE

First, contents of embodiments according to the present disclosure will be listed and described.

(1) A data visualization apparatus according to an embodiment of the present disclosure includes a data obtaining unit that obtains, from a database, target data that is at least one of measurement data or a calculation result of calculation using the measurement data and also obtains identification information of a user, an authorization unit that grants, based on the identification information of the user, authority to perform access processing that is at least one of processing of obtaining the measurement data from the database or processing of performing calculation using the measurement data in the database to a processing unit, and the processing unit that performs, based on the target data obtained by the authority via the data obtaining unit, processing of creating a confirmation screen including the measurement data or the calculation result and processing of causing a display to display the confirmation screen.

With this configuration, since various authority can be set for processing using the database in accordance with the type of user, appropriate authority can be set in accordance with the type of user, and an increase in the processing load on the database side can be suppressed. Therefore, in the configurations in which the measurement data obtained from the database is visualized, the database can be used more smoothly.

(2) Preferably, the processing unit includes a display component creating unit that, in accordance with an instruction from a user, creates or updates one or more display components constituting the confirmation screen, and a confirmation screen creating unit that, in accordance with an instruction from a user, creates or updates the confirmation screen by disposing the one or more display components created by the display component creating unit. The authorization unit grants, to the processing unit, the authority that allows the confirmation screen creating unit to obtain a smaller number of pieces of the target data than the display component creating unit.

With this configuration, it is possible to realize an excellent system in which various confirmation screens corresponding to various applications can be easily created using the display component, appropriate authority corresponding to the type of user are set, and an increase in the processing load on the database side is suppressed. In particular, by separating the authority related to the display components and the authority related to the confirmation screen, more effective authorization can be realized.

(3) More preferably, the processing unit further includes a display processing unit that performs processing of displaying the confirmation screen in accordance with an instruction from a user. The authorization unit grants, to the processing unit, the authority that allows the display processing unit to obtain a smaller number of pieces of the target data than the confirmation screen creating unit.

With this configuration, since the authority related to the display components, the authority related to the confirmation screen, and the authority related to the screen viewing can be separated, more effective authority setting can be realized.

(4) Preferably, the authority includes at least any one of authority to set a temporal range of the measurement data to be obtained from the database, authority to set a unit of time of the measurement data to be obtained from the database, and authority to set a type of calculation using the measurement data.

With the configuration in which such parameters are set, it is possible to effectively suppress an increase in the processing load on the database side.

(5) Preferably, the processing unit includes a display component creating unit that, in accordance with an instruction from a user, creates or updates one or more display components constituting the confirmation screen, and a confirmation screen creating unit that, in accordance with an instruction from a user, creates or updates the confirmation screen by disposing the one or more display components created by the display component creating unit. The data visualization apparatus further includes a restriction unit that, in a state in which the confirmation screen creating unit is granted the authority, limits at least one of a time taken to perform the access processing once or the number of times of the access processing per certain time.

With this configuration, access processing is limited separately from the authority, and an increase in the processing load on the database side can be more reliably suppressed.

(6) More preferably, the restriction unit makes a predetermined notification in response to a corresponding predetermined condition being satisfied by at least one of the time taken to perform the access processing once or the number of times of the access processing per certain time.

With this configuration, it is possible to warn a user who is authorized for the access processing of an increase in processing load on the database side.

(7) Preferably, the processing unit performs processing of further displaying a time taken for the access processing on the confirmation screen.

With this configuration, the user who is authorized for the access processing can easily recognize the state of the processing load on the database side.

(8) A data processing method according to an embodiment of the present disclosure is a data processing method for a data visualization apparatus. The data processing method includes obtaining, from a database, target data that is at least one of measurement data or a calculation result of calculation using the measurement data and also obtaining identification information of a user, setting, based on the identification information of the user, authority to perform access processing that is at least one of processing of obtaining the measurement data from the database or processing of performing calculation using the measurement data in the database, and performing, based on the target data obtained by the authority, processing of creating a confirmation screen including the measurement data or the calculation result and processing of causing a display to display the confirmation screen.

With this configuration, since various authority can be set for processing using the database in accordance with the type of user, it is possible to set appropriate authority in accordance with the type of user and to suppress an increase in the processing load on the database side. Therefore, in the configuration in which the measurement data obtained from the database is visualized, the database can be used more smoothly.

(9) A data processing program according to an embodiment of the present disclosure is a data processing program used in a data visualization apparatus. The data processing program causes a computer to obtain, from a database, target data that is at least one of measurement data or a calculation result of calculation using the measurement data and also obtain identification information of a user, set, based on the identification information of the user, authority to perform access processing that is at least one of processing of obtaining the measurement data from the database or processing of performing calculation using the measurement data in the database, and perform, based on the target data obtained by the authority via the data obtaining unit, processing of creating a confirmation screen including the measurement data or the calculation result and processing of causing a display to display the confirmation screen.

With this configuration, since various authority can be set for processing using the database in accordance with the type of user, appropriate authority can be set in accordance with the type of user, and an increase in the processing load on the database side can be suppressed. Therefore, in the configurations in which the measurement data obtained from the database is visualized, the database can be used more smoothly.

Hereinafter, embodiments according to the present disclosure will be described in detail with reference to the drawings. In the description of the drawings, like or corresponding elements are remarked by like reference numerals and redundant descriptions thereof will be omitted. At least some of the embodiments described below may be arbitrarily combined.

[Configuration and Basic Operation]

FIG. 1 is a diagram illustrating a configuration of a management system according to an embodiment of the present disclosure.

Referring to FIG. 1, a management system 201 includes a data visualization apparatus 101, a display 131, servers 132A and 132B, and a database 133.

Server 132A is, for example, a Web server. Server 132B is, for example, a REST (Representational State Transfer) API (Web Application Programming Interface) server. Server 132A and server 132B implement different Web APIs from each other.

More specifically, each of server 132A and server 132B prepares a URL (Uniform Resource Locator) for each processing, and receives a command such as a request, a response, or a post which are in accordance with an http (Hypertext Transfer Protocol) at the URL to perform processing in accordance with the received command.

In database 133, for example, measurement data based on measurement results by one or more sensors (not illustrated) is stored. The measurement data includes, for example, a flow rate, a temperature, a measurement time, a measurement location, a sensor lot number, and the like.

Server 132B obtains the measurement data from database 133 in accordance with the command, for example. Server 132B performs a calculation using the obtained measurement data in accordance with the command, for example.

Data visualization apparatus 101 obtains target data, which is at least one of the measurement data or the calculation result using the measurement data, from database 133 via a network 134 such as the Internet and server 132B, and displays a screen based on the obtained target data on display 131.

Data visualization apparatus 101 and display 131 may be integrated. Network 134 may be a network other than the Internet, such as a local network.

[Data Visualization Apparatus]

Data visualization apparatus 101 includes a data obtaining unit 11, a processing unit 14, an authorization unit 15, an input reception unit 16, a storage unit 17, and a restriction unit 18. Processing unit 14 includes a display component creating unit 21, a confirmation screen creating unit 22, and a display processing unit 23.

Data obtaining unit 11 obtains the target data. Based on the target data obtained by data obtaining unit 11, processing unit 14 performs processing of displaying content related to the measurement data on a confirmation screen, that is, performs processing of creating a confirmation screen including the measurement data or the calculation result and processing of causing display 131 to display the confirmation screen.

For example, in processing unit 14, display component creating unit 21 creates or updates one or more display components that constitute the confirmation screen in accordance with an instruction from a user.

For example, confirmation screen creating unit 22 creates or updates the confirmation screen by disposing the display components created by display component creating unit 21 in accordance with an instruction from a user.

For example, display processing unit 23 performs processing of displaying the confirmation screen on display 131 in accordance with an instruction from a user.

Storage unit 17 stores, for example, a plurality of OSS (Open Source Software) libraries for creating the corresponding display components.

The OSS libraries are, for example, flot for creating a graph and gantt-chart-d3 for creating a gantt chart.

Input reception unit 16 receives, for example, an input operation by a user via a keyboard or a mouse.

Upon receiving the input operation by the user, input reception unit 16 outputs information indicating the received input content to processing unit 14.

More specifically, when data visualization apparatus 101 is activated and a predetermined operation is performed by the user via a keyboard, a mouse, or the like, for example, input reception unit 16 outputs operation information indicating the content of the operation performed by the user to processing unit 14.

Processing unit 14 transmits an http request to server 132A based on the operation information received from input reception unit 16.

More specifically, processing unit 14 creates an http request including a URLa for login processing based on the operation information received from input reception unit 16, and outputs the created http request and the operation information to data obtaining unit 11.

Data obtaining unit 11 transmits the http request received from processing unit 14 to server 132A.

Upon receiving the http request from data visualization apparatus 101, server 132A creates an http response including an HTML (HyperText Markup Language) file including a GUI (Graphical User Interface) for login processing based on the received http request, and transmits the created http response to data visualization apparatus 101.

Upon receiving the http response from server 132A, data visualization apparatus 101 performs, based on the received http response, processing of displaying, on display 131, a screen on which the GUI for login processing is drawn on a Web browser.

More specifically, data obtaining unit 11 in data visualization apparatus 101 receives the http response transmitted from server 132A, obtains the HTML file from the received http response, and outputs the HTML file to processing unit 14.

Processing unit 14 obtains the GUI for login processing included in the HTML file received from data obtaining unit 11, creates a screen on which the obtained GUI for login processing is drawn on the Web browser, and displays the created screen on display 131.

For example, a user inputs his or her own "user ID (Identification)" and "password" in fields for inputting "user ID" and "password" in the GUI for login processing displayed on display 131, and performs an operation of transmitting them to server 132A to the Web browser.

Upon receiving the operation by the user, input reception unit 16 outputs a received input content, that is, the "user ID" and the "password" to processing unit 14.

Processing unit 14 creates an http post including the "user ID" and the "password" based on the input content received from input reception unit 16, and transmits the created http post to server 132A via data obtaining unit 11.

Server 132A receives the http post from data visualization apparatus 101 and executes the login processing based on the received http post.

In the login processing, server 132A determines whether to permit the login of the user having the user ID based on the "user ID" and the "password" included in the http post.

Then, when server 132A determines to permit the login of the user having the user ID, server 132A creates, for example, an http cookie indicating the user ID and a type of user, and transmits the created http cookie to data visualization apparatus 101.

FIG. 2 is a diagram illustrating an example of a type and authority of user in the management system according to the embodiment of the present disclosure.

Referring to FIG. 2, in management system 201, the user is classified into, for example, any one of a system administrator, a display component creator, a confirmation screen creator, and a viewer.

The system administrator, the display component creator, the confirmation screen creator, and the viewer have, in this order, more authority for processing.

More specifically, the viewer can, for example, perform processing of viewing a confirmation screen created by an operation of the confirmation screen creator.

Data visualization apparatus 101 performs processing of displaying the confirmation screen on display 131 in accordance with an operation of the viewer.

The confirmation screen creator can, for example, perform processing of creating the confirmation screen in addition to the processing of viewing the confirmation screen.

Data visualization apparatus 101 creates the confirmation screen on which the display component created by an operation of the display component creator is disposed in accordance with the operation of the confirmation screen creator, and displays the created confirmation screen on display 131.

In addition, the confirmation screen creator can determine whether to allow the viewer to view the created confirmation screen.

Thus, the viewer can view the confirmation screen permitted to be viewed by the confirmation screen creator.

On the other hand, when the confirmation screen creator does not permit the viewer to view the confirmation screen, for example, data visualization apparatus 101 performs processing of displaying a message indicating that the viewer is not permitted to view the confirmation screen on display 131 in response to the operation for viewing the confirmation screen by the viewer.

The display component creator can perform, for example, processing of creating a display component in addition to processing of creating and viewing the confirmation screen.

Data visualization apparatus 101 creates one or more display components constituting the confirmation screen in accordance with an operation of the display component creator.

The display component creator can determine whether to permit the confirmation screen creator to edit the display components created by the display component creator.

Thus, when the display component creator permits the confirmation screen creator to edit the display components, the confirmation screen creator can edit the display components.

The display component creator can determine whether to permit the viewer to view the display components included in the confirmation screen created by the confirmation screen creator.

Data visualization apparatus 101 does not display the display components in the confirmation screen on display 131, for example, when the display component creator does not permit the viewer to view the display components.

The system administrator can perform a user management processing of managing the type of each user in management system 201 in addition to, for example, processing of creating the display components, creating the confirmation screen, and viewing the confirmation screen.

FIG. 3 is a diagram illustrating an example of processing that can be performed for each user type in the management system according to the embodiment of the present disclosure. FIG. 3 illustrates a case where the display component creator permits the confirmation screen creator to edit the display components and the confirmation screen creator permits the viewer to view the confirmation screen.

Referring to FIG. 3, the type of user who can execute the user management processing is the system administrator. The types of user who can execute processing of creating the display components are the system administrator and the display component creator. The types of user who can edit the display components are the system administrator, the display component creator, and the confirmation screen creator. The types of user who can view the display components are the system administrator, the display component creator, the confirmation screen creator, and the viewer. The types of user who can execute processing of creating the confirmation screen are the system administrator, the display component creator, and the confirmation screen creator. The types of user who can view the confirmation screen are the system administrator, the display component creator, the confirmation screen creator, and the viewer.

FIG. 4 is a diagram illustrating another example of possible processing for each user type in the management system according to the embodiment of the present disclosure. FIG. 4 illustrates a case where the display component creator does not permit the confirmation screen creator to edit the display components and the confirmation screen creator does not permit the viewer to view the confirmation screen.

Referring to FIG. 4, the type of user who can execute the user management processing is the system administrator. The types of user who can execute processing of creating the display components are the system administrator and the display component creator. The types of user who can edit the display components are the system administrator and the display component creator. The types of user who can view the display components are the system administrator, the display component creator, and the confirmation screen creator. The types of user who can execute processing of creating the confirmation screen are the system administrator, the display component creator, and the confirmation screen creator. The type of users who can view the confirmation screen are the system administrator, the display component creator, and the confirmation screen creator.

Referring again to FIG. 1, authorization unit 15 can set a plurality of types of authority for access processing which is at least one of obtaining measurement data from database 133 or calculation using the measurement data in database 133.

More specifically, data obtaining unit 11 in data visualization apparatus 101 receives the http cookie transmitted from server 132A and outputs the received http cookie to processing unit 14. That is, data obtaining unit 11 obtains the user ID.

Processing unit 14 outputs the http cookie received from data obtaining unit 11 to authorization unit 15.

Authorization unit 15 sets authority for processing performed by processing unit 14 in accordance with the type of user indicated by the http cookie received from processing unit 14.

Specifically, for example, when authorization unit 15 receives an http cookie indicating the confirmation screen creator from processing unit 14, authorization unit 15 limits processing executable by processing unit 14 to processing of displaying the confirmation screen on display 131 and processing of creating the confirmation screen, and outputs restriction information indicating the restricted content to processing unit 14.

When authorization unit 15 receives, for example, an http cookie indicating the display component creator from processing unit 14, authorization unit 15 limits processing executable by processing unit 14 to processing of displaying the confirmation screen on display 131, processing of creating the confirmation screen, and processing of creating the display components, and outputs restriction information indicating the restricted content to processing unit 14.

When authorization unit 15 receives, for example, an http cookie indicating the system administrator from processing unit 14, authorization unit 15 does not limit processing executable by processing unit 14 and outputs restriction information indicating that the restriction is not performed to processing unit 14.

Processing unit 14 receives the restriction information from authorization unit 15 and performs processing of displaying, on display 131, a top screen corresponding to the restriction information, that is, the type of user. For example, the top screen includes a list of display component types and a list of confirmation screen types.

FIG. 5 is a diagram illustrating an example of the top screen displayed on the display in the management system according to the embodiment of the present disclosure. FIG. 5 illustrates the top screen when the type of user is the display component creator.

Referring to FIG. 5, an upper region r11 of the top screen includes a confirmation screen table Tab1 indicating a correspondence between one or more confirmation screens created by confirmation screen creating unit 22 and buttons B1 for displaying the respective confirmation screens on display 131.

A lower region r12 of the top screen includes a display component table Tab2 indicating a correspondence relationship between one or more display components created by display component creating unit 21 and buttons B2 for displaying the respective display components on display 131.

Above confirmation screen table Tab1 in region r11, a button B3 for causing confirmation screen creating unit 22 to create a new confirmation screen is included.

Above display component table Tab2 in region r12, a button B4 for causing display component creating unit 21 to create a new display component is included.

Hyperlinks of URLs corresponding to the respective processing are set in buttons B1 to B4, respectively.

Here, a top screen in the case where the type of user is a confirmation screen creator does not include region r12 corresponding to processing of creating the display component, as compared with the top screen illustrated in FIG. 5, for example.

Further, a top screen in the case where the type of user is a viewer does not include region r12 corresponding to processing of creating the display component and button B3 in region r11, as compared with the top screen illustrated in FIG. 5, for example.

[Creation of Display Component]

For example, when a user whose type is a display component creator creates, as a display component, a graph G1 based on a target data as an example of content related to measurement data, the user performs an operation of pressing button B4 using a keyboard, a mouse, or the like to data visualization apparatus 101.

Referring again to FIG. 1, when input reception unit 16 receives the operation by the user, for example, input reception unit 16 outputs operation information indicating the content of the operation by the user to processing unit 14.

Processing unit 14 transmits an http request including a URLb for creating the display component to server 132A via data obtaining unit 11, based on the operation information received from input reception unit 16.

Server 132A receives, for example, the http request from data visualization apparatus 101, and based on the received http request, transmits, to data visualization apparatus 101, an http response including an HTML file containing a program (hereinafter also referred to as a creation program) described using JavaScript (registered trademark) or the like for creating the display components.

When processing unit 14 in data visualization apparatus 101 receives the HTML file included in the http response from server 132A via data obtaining unit 11, processing unit 14 obtains the creation program from the received HTML file and executes the obtained creation program.

Thus, display component creating unit 21 creates a new display component.

More specifically, when the creation program is executed by processing unit 14, display component creating unit 21 creates a selection screen for allowing the user to select the type of display component to be created, and outputs the created selection screen to display processing unit 23.

Display processing unit 23 performs processing of displaying the selection screen received from display component creating unit 21 on display 131.

Figure 6:
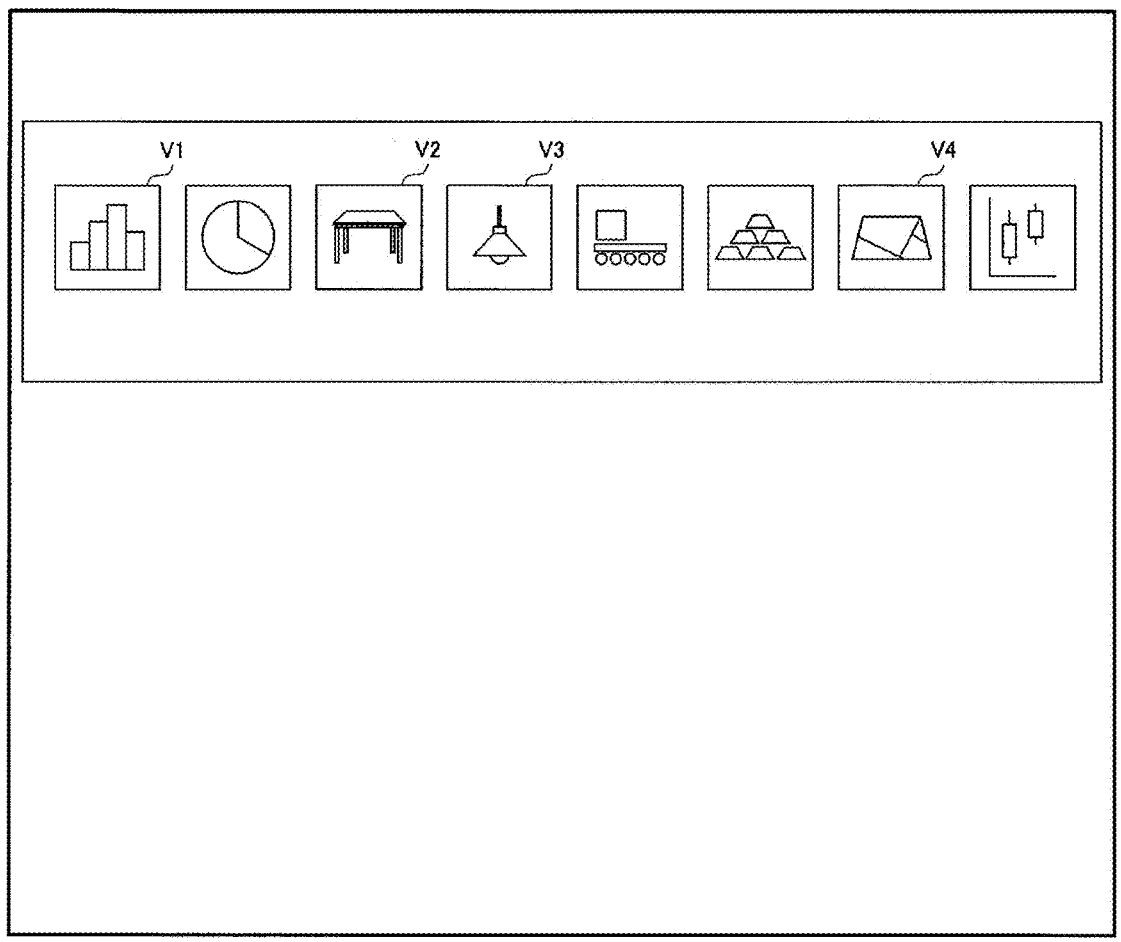
FIG. 6 is a diagram illustrating an example of a selection screen displayed on a display in the management system according to the embodiment of the present disclosure.

FIG. 6 is a diagram illustrating an example of the selection screen displayed on the display in the management system according to the embodiment of the present disclosure.

Referring to FIG. 6, the selection screen includes a plurality of icons for each type of display components, for example. Specifically, the selection screen includes, for example, an icon V1 for creating a display component such as a bar graph and a line graph, an icon V2 for creating a display component of a table, an icon V3 for creating a display component of Andon, an icon V4 for creating a display component of a map, and the like.

The user can create a desired type of display component by selecting one of the icons on the selection screen.

More specifically, the user can create a display component such as a bar graph and a line graph by selecting icon V1 on the selection screen, for example.

For example, the user performs an operation of selecting icon V1 to data visualization apparatus 101.

For example, when input reception unit 16 receives the operation by the user, input reception unit 16 outputs operation information indicating the content of the operation by the user to display component creating unit 21 in processing unit 14.

Based on the operation information received from input reception unit 16, display component creating unit 21 creates a detailed screen that allows the user to select the type of graph to be created based on the operation information received from input reception section 16, and outputs the created detailed screen to display processing unit 23.

Display processing unit 23 performs processing of displaying the detailed screen received from display component creating unit 21 on display 131.

Figure 7:
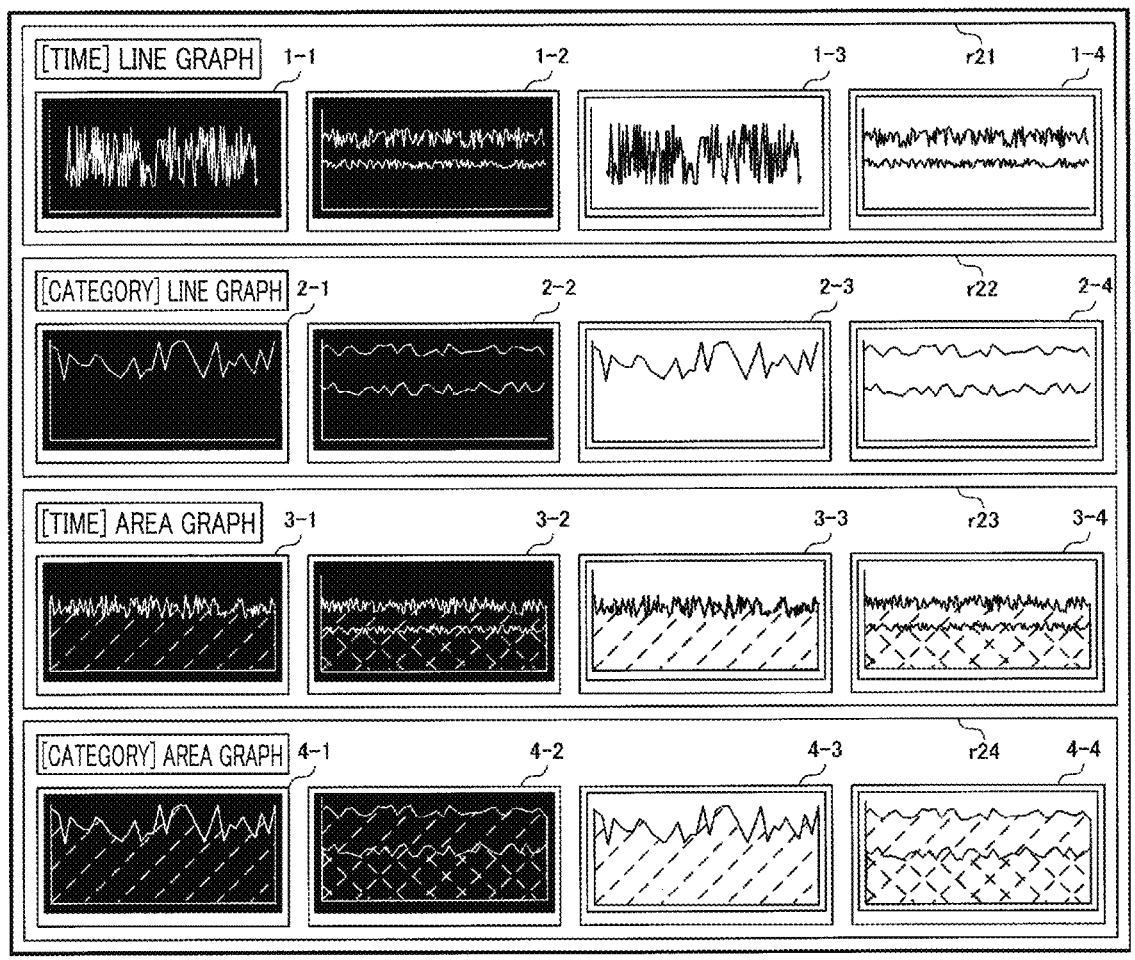
FIG. 7 is a diagram illustrating an example of a detailed screen displayed on a display in the management system according to the embodiment of the present disclosure.

FIG. 7 is a diagram illustrating an example of the detailed screen displayed on the display in the management system according to the embodiment of the present disclosure.

Referring to FIG. 7, the detailed screen includes a region r21 including a plurality of types of line graph 1 whose horizontal axes represent time, a region r22 including a plurality of types of line graph 2 whose horizontal axes represent a category, a region r23 including a plurality of types of area graph 1 whose horizontal axes represent time, and a region r24 including a plurality of types of area graph 2 whose horizontal axes represent a category.

Region r21 includes a type "1-1" in which the background color is black and one line graph 1 is drawn, a type "1-2" in which the background color is black and a plurality of line graphs 1 are drawn, a type "1-3" in which the background color is white and one line graph 1 is drawn, and a type "1-4" in which the background color is white and a plurality of line graphs 1 are drawn.

Region r22 includes a type "2-1" in which the background color is black and one line graph 2 is drawn, a type "2-2" in which the background color is black and a plurality of line graphs 2 are drawn, a type "2-3" in which the background color is white and one line graph 2 is drawn, and a type "2-4" in which the background color is white and a plurality of line graphs 2 are drawn.

Region r23 includes a type "3-1" in which the background color is black and one area graph 1 is drawn, a type "3-2" in which the background color is black and a plurality of area graphs 1 are drawn, a type "3-3" in which the background color is white and one area graph 1 is drawn, and a type "3-4" in which the background color is white and a plurality of area graphs 1 are drawn.

Region r24 includes a type "4-1" in which the background color is black and one area graph 2 is drawn, a type "4-2" in which the background color is black and a plurality of area graphs 2 are drawn, a type "4-3" in which the background color is white and one area graph 2 is drawn, and a type "4-4" in which the background color is white and a plurality of area graphs 2 are drawn.

For example, the user performs an operation of selecting type "1-3" to data visualization apparatus 101.

For example, when input reception unit 16 receives the operation by the user, input reception unit 16 outputs operation information indicating the content of the operation by the user to display component creating unit 21 in processing unit 14.

Based on the operation information received from input reception unit 16, display component creating unit 21 creates an initial setting screen that allows the user to set initial parameters of a graph to be created, and outputs the created initial setting screen to display processing unit 23.

Display processing unit 23 performs processing of displaying the initial setting screen received from display component creating unit 21 on display 131.

Figure 8:
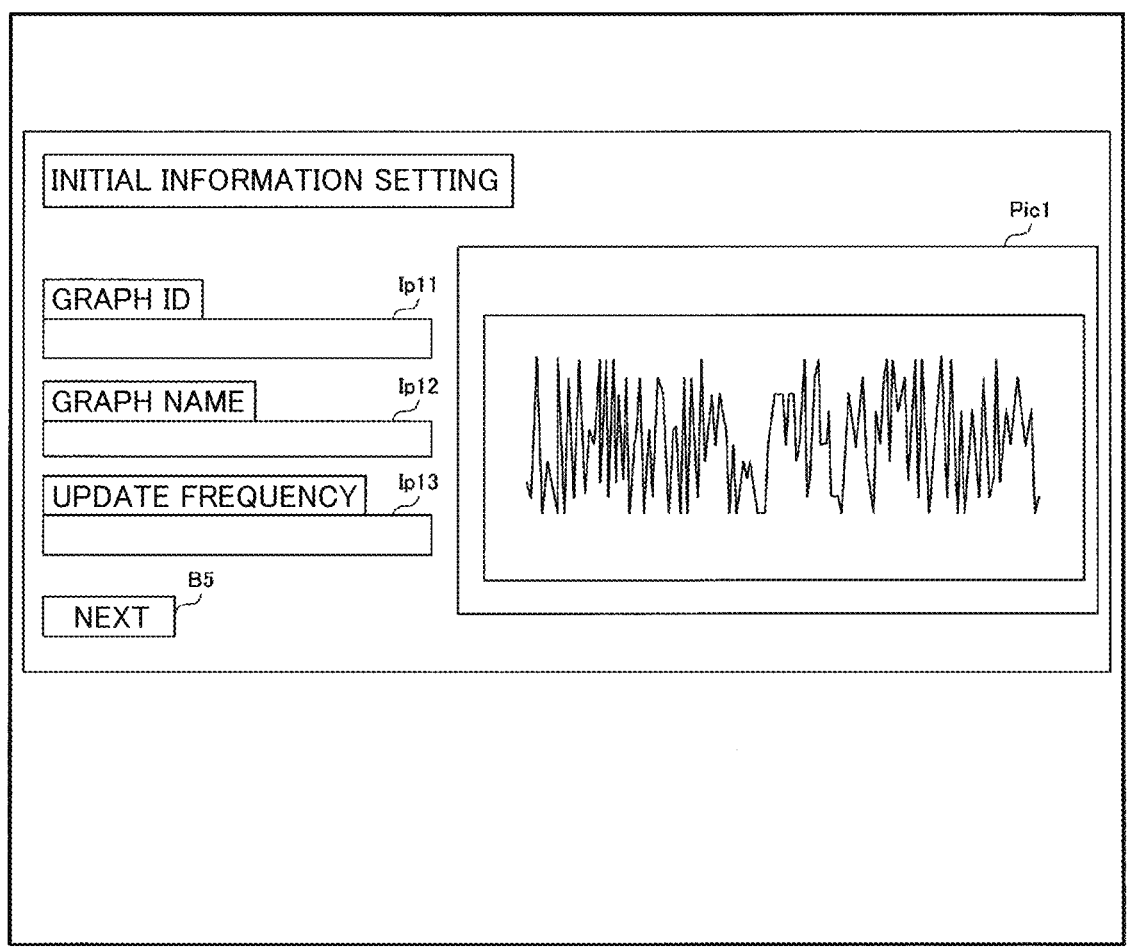
FIG. 8 is a diagram illustrating an example of an initial setting screen displayed on a display in the management system according to the embodiment of the present disclosure.

FIG. 8 is a diagram illustrating an example of the initial setting screen that is displayed on the display in the management system according to the embodiment of the present disclosure.

Referring to FIG. 8, the initial setting screen includes, for example, an image Pic1 indicating that a graph to be created is of type "1-3", input fields Ip11 to Ip13 for inputting "graph ID", "graph name", and "update frequency" as initial parameters, respectively, and a button B5 for causing display component creating unit 21 to create the graph.

For example, the user inputs a part or all of "graph ID", "graph name", and "update frequency" into the respective input fields, and performs an operation of pressing button B5 to the Web browser.

For example, the user may perform an operation of pressing button B5 to the Web browser without inputting "graph ID", "graph name", and "update frequency" into the respective input fields.

Upon receiving the operation by the user, input reception unit 16 outputs the input content of each input field to display component creating unit 21 in processing unit 14.

Here, the creation program includes, for example, an instruction described using SQL (hereinafter also referred to as a temporary SQL instruction) for performing access processing which is at least one of obtaining measurement data from database 133 or calculation using measurement data in database 133.

Display component creating unit 21 creates an http post including the temporary SQL instruction and a URLc for access processing based on the input content received from input reception unit 16, and outputs the created http post to processing unit 14.

Processing unit 14 transmits the http post output from display component creating unit 21 to server 132B via data obtaining unit 11.

Server 132B receives the http post from data visualization apparatus 101 and executes access processing based on the received http post.

Server 132B obtains the temporary SQL instruction included in the received http post, and performs at least one of obtaining measurement data from database 133 or calculation using measurement data in database 133 in accordance with the obtained temporary SQL instruction.

More specifically, for example, when the content of the temporary SQL instruction is an instruction for obtaining measurement data from database 133, server 132B obtains measurement data indicated by the temporary SQL instruction.

For example, when the content of the temporary SQL instruction is an instruction for performing a calculation using measurement data in database 133, server 132B obtains measurement data indicated by the temporary SQL instruction and performs the calculation such as calculation of an average value using the obtained measurement data.

Target data is, for example, a format in accordance with a JavaScript Object Notation (JSON).

Then, server 132B creates an http response including the target data and transmits the http response to data visualization apparatus 101.

Upon receiving the http response from server 132B, data obtaining unit 11 in data visualization apparatus 101 obtains the target data included in the received http response, and outputs the obtained target data to display component creating unit 21 in processing unit 14.

Display component creating unit 21 uses the target data received from data obtaining unit 11 to draw a graph based on the target data as a display component.

More specifically, display component creating unit 21 obtains, for example, an OSS library for drawing a graph of type "1-3" from storage unit 17, and draws graph G1 based on the target data received from data obtaining unit 11 as a display component using the obtained OSS library.

Display component creating unit 21 then creates a component editing screen that includes the drawn graph G1 and a region r3 for editing graph G1, and outputs the created component editing screen to display processing unit 23.

Display processing unit 23 performs processing of displaying the component editing screen received from display component creating unit 21 on display 131.

Display component creating unit 21 can change content of the display component in accordance with one or more parameters.

Figure 9:
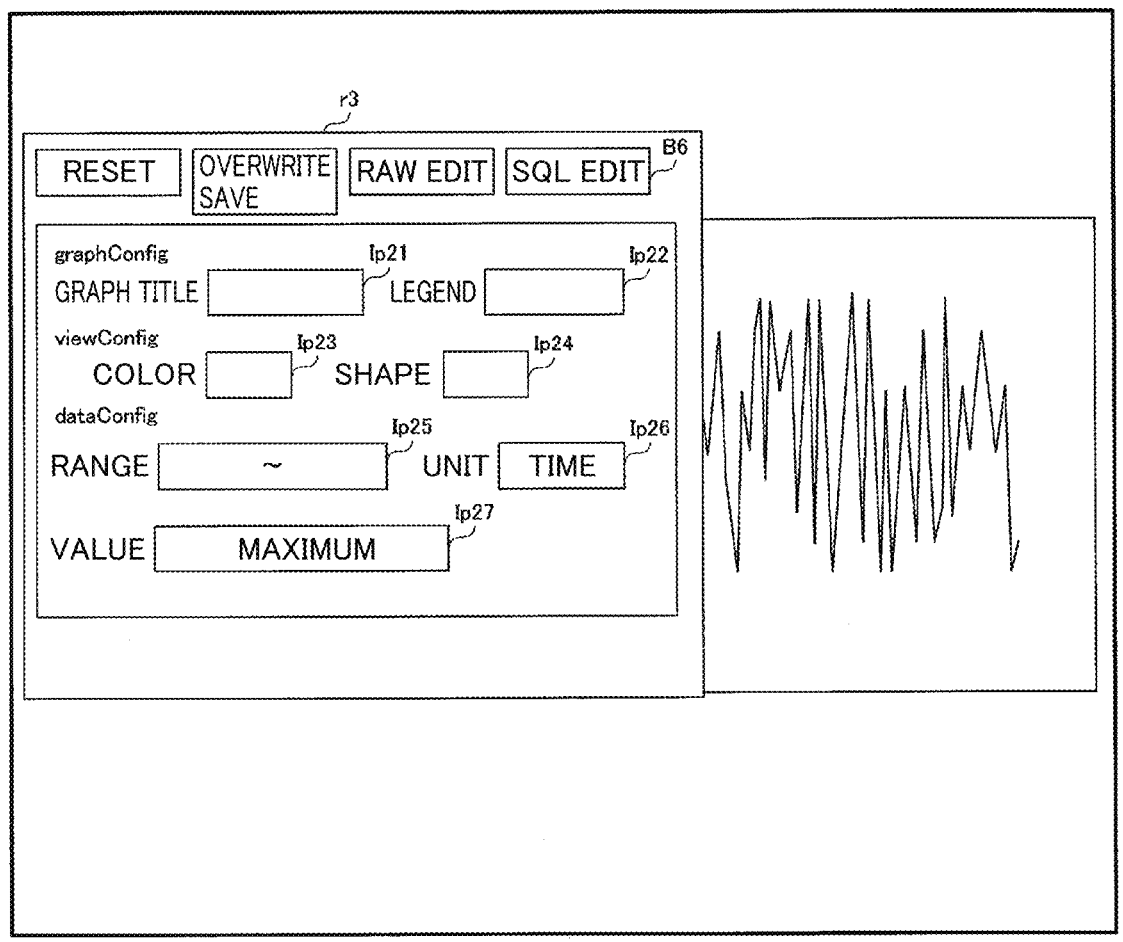
FIG. 9 is a diagram illustrating an example of a component editing screen displayed on a display in the management system according to the embodiment of the present disclosure.

FIG. 9 is a diagram illustrating an example of the component editing screen displayed on the display in the management system according to the embodiment of the present disclosure.

Referring to FIG. 9, on the component editing screen, region r3 is displayed so as to overlap graph G1. Region r3 includes "graphConfig" that includes an input field Ip21 for a graph title and an input field Ip22 for a legend, "viewConfig" that includes an input field Ip23 for a graph color and an input field Ip24 for a shape, and "dataConfig" that includes an input field Ip25 for a temporal range of the graph, an input field Ip26 for an unit of time of the graph, and an input field Ip27 for inputting a type of calculation using measurement data in the graph.

In "graphConfig", the user can set a graph title and a legend as examples of parameters.

In "viewConfig", the user can set a graph color and a shape as examples of parameters.

In "dataConfig", the user can set a temporal range of the graph, a unit of time of the graph, and a type of calculation using measurement data in the graph as examples of parameters.

In addition, a plurality of buttons including a button B6 for editing SQL are displayed in an upper portion of region r3.

When editing SQL, the user performs an operation of pressing button B6 to the Web browser.

For example, when input reception unit 16 receives the operation by the user, input reception unit 16 outputs operation information indicating the content of the operation by the user to display component creating unit 21 in processing unit 14.

Display component creating unit 21 creates a dataConfig screen for editing a temporary SQL instruction based on the operation information received from input reception unit 16, and outputs the created dataConfig screen to display processing unit 23.

Display processing unit 23 performs processing of displaying the dataConfig screen received from display component creating unit 21 on display 131.

Figure 10:
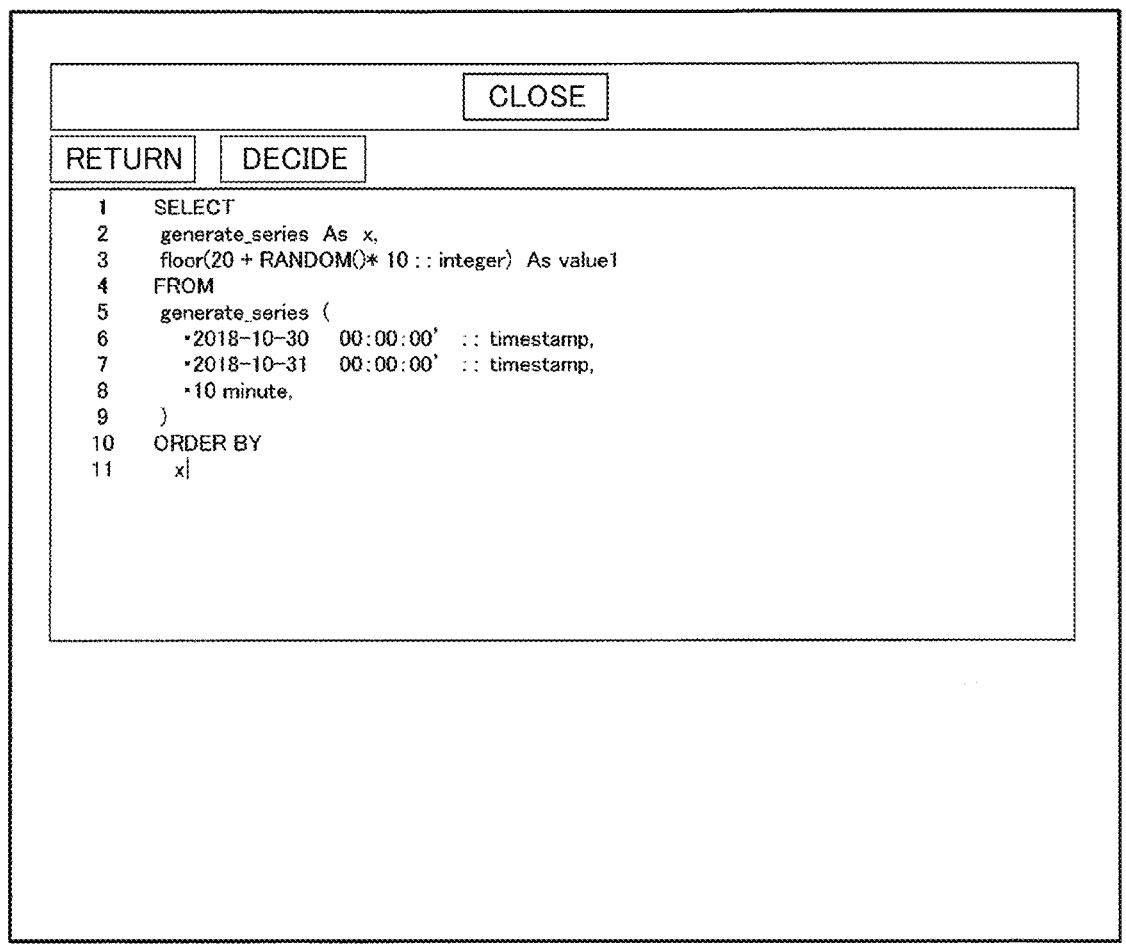
FIG. 10 is a diagram illustrating an example of a dataConfig screen displayed on a display in the management system according to the embodiment of the present disclosure.

FIG. 10 is a diagram illustrating an example of the dataConfig screen displayed on the display in the management system according to the embodiment of the present disclosure.

Referring to FIG. 10, in the above case, an instruction for performing the access processing, that is, a temporary SQL instruction is displayed on the dataConfig screen.

The user performs an operation of editing the temporary SQL instruction displayed on display 131 to the Web browser using a keyboard or a mouse.

Specifically, the user performs, to the Web browser, an operation of inputting an SQL instruction whose content is to obtain, from database 133, measurement data of a flow rate at a predetermined time interval in a predetermined period measured by a certain sensor, using, for example, the keyboard or the mouse.

Referring again to FIG. 1, for example, upon receiving the operation by the user, input reception unit 16 outputs operation information indicating the content of the operation by the user to display component creating unit 21 in processing unit 14.

Display component creating unit 21 creates a new SQL instruction by updating the temporary SQL instruction based on the operation information received from input reception unit 16. Display component creating unit 21 then creates an http post including the created new SQL instruction and the URLc for access processing, and transmits the created http post to server 132B via data obtaining unit 11. Hereinafter, each of the temporary SQL instruction and the new SQL instruction is also referred to as an SQL instruction.

Server 132B receives the http post from data visualization apparatus 101, obtains the new SQL instruction included in the received http post, and obtains, from database 133, measurement data of a flow rate at the predetermined time interval in the period indicated by the new SQL instruction in accordance with the obtained new SQL instruction.

Server 132B then creates an http response including the obtained measurement data, which is target data, and transmits the http response to data visualization apparatus 101.

Upon receiving the http response from server 132B, data obtaining unit 11 in data visualization apparatus 101 obtains the target data included in the received http response, and outputs the obtained target data to display component creating unit 21 in processing unit 14.

Display component creating unit 21 uses the target data received from data obtaining unit 11 to create a component editing screen including graph G1 based on the target data, and outputs the created component editing screen to display processing unit 23.

Display processing unit 23 performs processing for displaying the component editing screen received from display component creating unit 21 on display 131.

Data visualization apparatus 101 may have a configuration in which the SQL instruction is edited by an operation in which the user inputs, as parameters, the temporal range of graph G1, the unit of time of graph G1, and the type of calculation using the measurement data in graph G1 into the respective input fields Ip25, Ip26, and Ip27 in the dataConfig of the component editing screen illustrated in FIG. 9.

For example, when input reception unit 16 receives the operation by the user, input reception unit 16 outputs input content information indicating input content by the user to display component creating unit 21 in processing unit 14.

Based on the input content information received from input reception unit 16, display component creating unit 21 determines whether it is necessary to edit the SQL instruction in accordance with the change of each of the parameters. When display component creating unit 21 determines that the SQL instruction needs to be editted, display component creating unit 21 edits corresponding parts in the SQL instruction in accordance with the changed parameters.

Authorization unit 15 in data visualization apparatus 101 sets authority based on the content of the SQL instruction. The authority include at least any one of authority that sets the temporal range and the unit of time of measurement data to be obtained from database 133, or authority that sets the type of calculation using the measurement data.

More specifically, display component creating unit 21 outputs the content of the edited SQL instruction to authorization unit 15, for example, when the SQL instruction is edited via the dataConfig screen illustrated in FIG. 10 by a user whose type is the display component creator, or when display component creating unit 21 edits the SQL instruction by the user's input into each of the input fields in the dataConfig of the component editing screen illustrated in FIG. 9.

Based on the content of the SQL instruction received from display component creating unit 21, authorization unit 15 can set a plurality of types of authority for access processing which are at least one of processing of obtaining the measurement data from database 133 or processing of performing calculation using the measurement data in database 133.

For example, authorization unit 15 grants narrower authority to confirmation screen creating unit 22 than to display component creating unit 21. For example, authorization unit 15 grants, to processing unit 14, the authority that allows confirmation screen creating unit 22 to obtain a smaller number of pieces of the target data than display component creating unit 21.

Specifically, for example, when the content of the SQL instruction received from display component creating unit 21 is content which enables confirmation screen creating unit 22 to set the temporal range and the unit of time of the measurement data to be obtained from database 133, authorization unit 15 outputs, to confirmation screen creating unit 22, authority information indicating that confirmation screen creating unit 22 has the authority to make such a setting.

Accordingly, a user whose type is a confirmation screen creator can set the temporal range and the unit of time of the measurement data to be obtained from database 133 in processing of creating the confirmation screen.

Also, for example, authorization unit 15 grants narrower authority to display processing unit 23 than to confirmation screen creating unit 22. For example, the authorization unit 15 grants, to processing unit 14, the authority that allows display processing unit 23 to obtain a smaller number of pieces of the target data than confirmation screen creating unit 22.

Specifically, for example, when the content of the SQL instruction received from display component creating unit 21 is content which enables display processing unit 23 to set the temporal range of the measurement data to be obtained from database 133, authorization unit 15 outputs, to display processing unit 23, authority information indicating that display processing unit 23 has the authority to make such a setting.

Accordingly, a user whose type is a viewer can set the temporal range of the display component disposed on the confirmation screen created by a user whose type is the confirmation screen creator.

For example, when a user whose type is a display component creator edits a graph title and a legend as parameters, the user performs, to the Web browser, an operation of inputting a new graph title and a new legend into input fields Ip21 and Ip22 on the component editing screen illustrated in FIG. 9.

Referring again to FIG. 1, for example, upon receiving the operation by the user, input reception unit 16 outputs operation information indicating the content of the operation by the user to display component creating unit 21 in processing unit 14.

Based on the operation information received from input reception unit 16, display component creating unit 21 creates a component editing screen including graph G1 in which a new graph title and a legend are set, and outputs the created component editing screen to display processing unit 23.

Display processing unit 23 performs processing for displaying the component editing screen received from display component creating unit 21 on display 131.

For example, when editing a graph color and a shape as parameters, the user performs, to the Web browser, an operation of inputting a new graph color and a new shape into input fields Ip23 and Ip24, respectively, on the component editing screen illustrated in FIG. 9.

For example, when input reception unit 16 receives the operation by the user, input reception unit 16 outputs operation information indicating the content of the operation by the user to display component creating unit 21 in processing unit 14.

Based on the operation information received from input reception unit 16, display component creating unit 21 creates a component editing screen including graph G1 in which the new graph color and the shape are set, and outputs the created component editing screen to display processing unit 23.

Display processing unit 23 performs processing of displaying the component editing screen received from display component creating unit 21 on display 131.

Thereafter, display component creating unit 21 transmits an http post including the SQL instruction and the URLc for access processing to server 132B at each time interval set in "update frequency" on the initial setting screen illustrated in FIG. 8.

Accordingly, display component creating unit 21 obtains new target data from database 133 via server 132B and data obtaining unit 11 at each time interval set in the "update frequency", and uses the obtained target data to update the display component such as graph G1 based on the target data.

Display component creating unit 21 stores the created display component in storage unit 17 in accordance with, for example, an operation by the user.

More specifically, for example, the user performs, to the Web browser, an operation of pressing an "overwrite save" button for saving the created display component among a plurality of buttons on the component editing screen illustrated in FIG. 9.

For example, when input reception unit 16 receives the operation by the user, input reception unit 16 outputs operation information indicating the content of the operation by the user to display component creating unit 21 in processing unit 14.

Display component creating unit 21 stores display component information including the created SQL instruction and the content of the set parameters in storage unit 17, based on the operation information received from input reception unit 16.

Thus, the new display component created by display component creating unit 21 and button B2 for displaying the display component on display 131 are added to display component table Tab2 on the top screen illustrated in FIG. 5.

[Update of Display Component]

For example, a user whose type is a display component creator performs, to the Web browser, an operation of pressing button B2 corresponding to graph G1 on the top screen illustrated in FIG. 5 using a keyboard, a mouse, or the like.

Referring again to FIG. 1, when input reception unit 16 receives the operation by the user, for example, input reception unit 16 outputs operation information indicating the content of the operation by the user to processing unit 14.

Processing unit 14 transmits an http request including the URLb for creating a display component to server 132A via data obtaining unit 11 based on the operation information received from input reception unit 16.

Upon receiving the http request from data visualization apparatus 101, server 132A transmits an http response including an HTML file storing a creation program to data visualization apparatus 101 based on the received http request.

When processing unit 14 in data visualization apparatus 101 receives the HTML file included in the http response from server 132A via data obtaining unit 11, processing unit 14 obtains the creation program from the received HTML file.

Processing unit 14 obtains display component information corresponding to graph G1 from storage unit 17 based on the operation information received from input reception unit 16. Processing unit 14 then executes the creation program in which the temporary SQL instruction in the obtained creation program is changed to the SQL instruction included in the obtained display component information.

As a result, the component editing screen including graph G1 corresponding to the display component information is displayed on display 131.

In data visualization apparatus 101, the display component is not limited to graph G1, and may be a different type of graph, table, Andon, process management table, Gantt chart, map information, box plot, or the like.

Figures 11, 12:
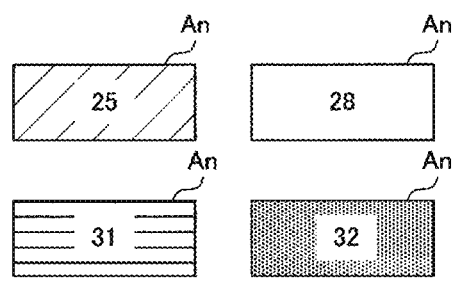
FIG. 11 is a diagram illustrating an example of a display component in the management system according to the embodiment of the present disclosure.
FIG. 12 is a diagram illustrating an example of a display component in the management system according to the embodiment of the present disclosure.

FIG. 11 is a diagram illustrating an example of the display component in the management system according to the embodiment of the present disclosure.

FIG. 11 illustrates a WBGT (Wet Bulb Globe Temperature) table as an example of the display component.

Referring to FIG. 11, the WBGT table indicates a correspondence of temperature and relative humidity to heat stress index calculated based on the temperature and the relative humidity.

In the WBGT table, different colors are used in accordance with a value of the heat stress index. Specifically, the color for a heat stress index less than 25, the color for a heat stress index of 25 to 28, the color for a heat stress index of 29 to 31, and the color for a heat stress index of 32 or more are different from each other. In FIG. 11, different colors are indicated by different hatchings.

For example, a class of the heat stress index illustrated in the WBGT table is displayed below the WBGT table. Specifically, the class for a heat stress index of less than 25 represents "Caution", the class for a heat stress index of 25 to 28 represents "Warning", the class for a heat stress index of 29 to 31 represents "Severe Warning", and the class for a heat stress index of 32 or more represents "Danger".

For example, when creating the WBGT table, a user selects icon V2 on the selection screen illustrated in FIG. 6.

Then, the user creates the WBGT table, for example, by performing an operation to data visualization apparatus 101 in accordance with the screen displayed on display 131.

FIG. 12 is a diagram illustrating an example of the display component in the management system according to the embodiment of the present disclosure. FIG. 12 illustrates a plurality of Andons An as an example of the display component. Andon is a display method of notifying a user of a warning according to displayed colors.

Referring to FIG. 12, Andons An indicate, for example, heat stress indices illustrated in the WBGT table. The colors of Andons An are colors corresponding to heat stress indices according to the WBGT table, for example. In FIG. 12, different colors are represented by different hatchings.

For example, when creating Andons, a user selects icon V3 on the selection screen illustrated in FIG. 6.

For example, the user then creates Andons by performing an operation to data visualization apparatus 101 in accordance with a screen displayed on display 131.

Figure 13:
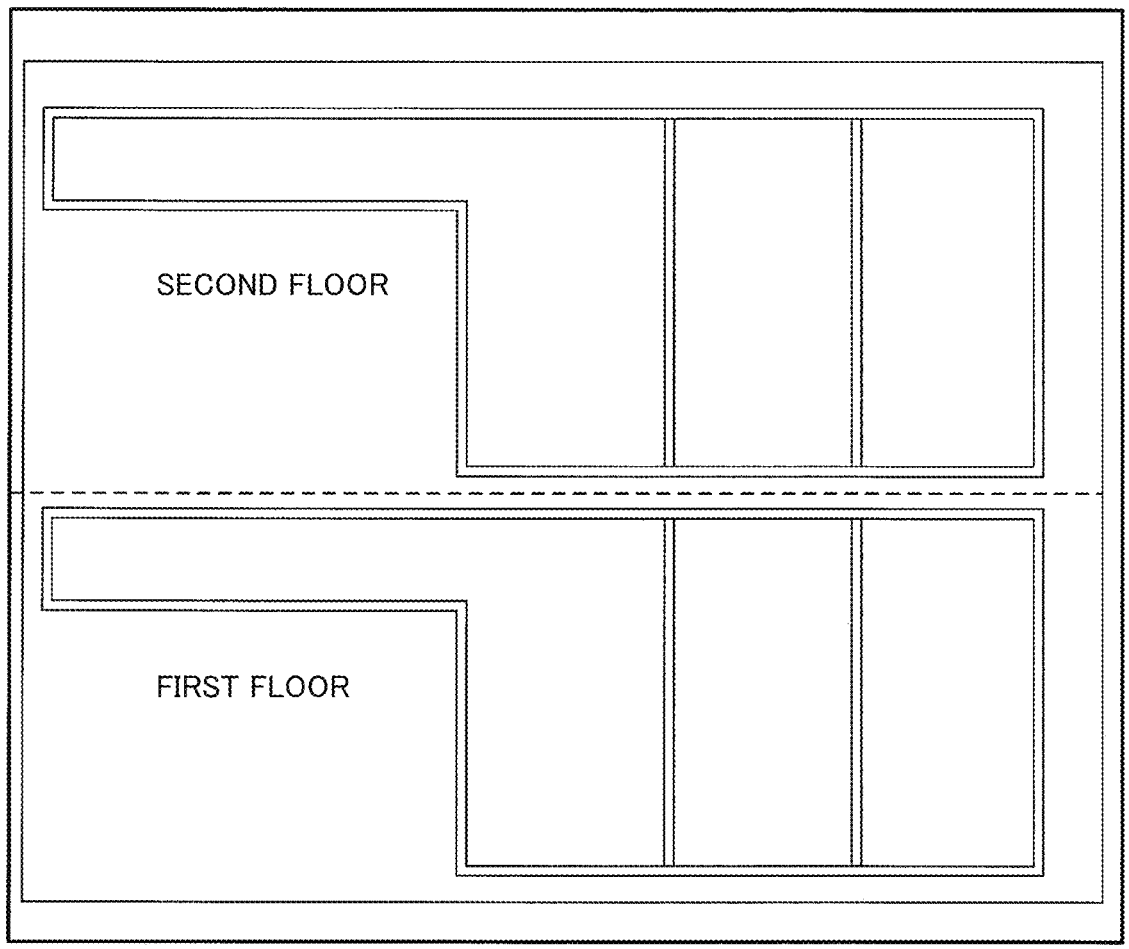
FIG. 13 is a diagram illustrating an example of a display component in the management system according to the embodiment of the present disclosure.

FIG. 13 is a diagram illustrating an example of the display component in the management system according to the embodiment of the present disclosure. FIG. 13 illustrates map information as an example of the display component.

Referring to FIG. 13, the map information indicates, for example, a floor plan of a two storied factory to be managed by management system 201.

When creating the map information, for example, a user selects icon V4 on the selection screen illustrated in FIG. 6.

For example, the user then creates the map information by performing an operation to data visualization apparatus 101 in accordance with a screen displayed on display 131.

[Creation of Confirmation Screen]

A user whose type is a confirmation screen creator or a display component creator, for example, performs, to data visualization apparatus 101, an operation of pressing button B3 on the top screen illustrated in FIG. 5 using a keyboard, a mouse, or the like.

Referring again to FIG. 1, when input reception unit 16 receives the operation by the user, for example, input reception unit 16 outputs operation information indicating the content of the operation by the user to processing unit 14.

Based on the operation information received from input reception unit 16, processing unit 14 transmits an http request including the URLd for creating a confirmation screen to server 132A via data obtaining unit 11.

When the http request is received from data visualization apparatus 101, server 132A transmits to data visualization apparatus 101, based on the received http request, an http response including an HTML file containing a program (hereinafter also referred to as a display program) described using JavaScript (registered trademark) or the like for displaying the confirmation screen.

When processing unit 14 in data visualization apparatus 101 receives the HTML file included in the http response from server 132A via data obtaining unit 11, processing unit 14 obtains the display program from the received HTML file and executes the obtained display program.

Accordingly, confirmation screen creating unit 22 creates the confirmation screen in which one or more display components created by display component creating unit 21 are disposed.

More specifically, when the display program is executed by processing unit 14, confirmation screen creating unit 22 creates a layout screen for disposing the display components, and outputs the created layout screen to display processing unit 23.

Display processing unit 23 performs processing for displaying the layout screen received from confirmation screen creating unit 22 on display 131.

Figure 14:
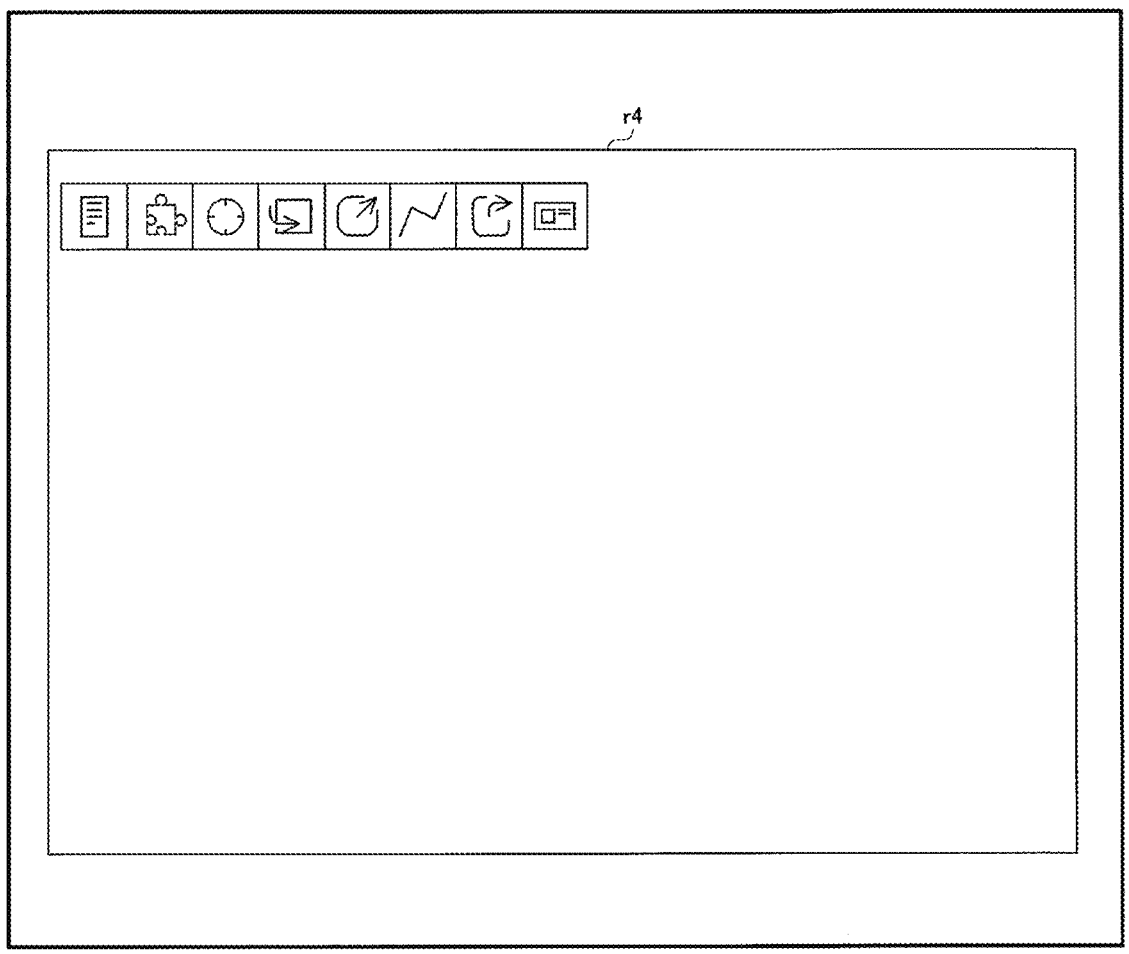
FIG. 14 is a diagram illustrating an example of a layout screen displayed on the display in the management system according to the embodiment of the present disclosure.

FIG. 14 is a diagram illustrating an example of the layout screen displayed on the display in the management system according to the embodiment of the present disclosure.

Referring to FIG. 14, the layout screen includes a region r4 in which a display component is to be disposed. A plurality of buttons for selecting the display component to be disposed are included in an upper part of region r4.

The user performs an operation of pressing a button corresponding to the display component to be disposed among the plurality of buttons to the Web browser. Then, the user performs, to the Web browser, an operation of selecting a position where the display component is to be disposed in region r4.

For example, when receiving the operation by the user, input reception unit 16 outputs operation information indicating the content of the operation by the user to confirmation screen creating unit 22 in processing unit 14.

Confirmation screen creating unit 22 disposes the display component in region r4 in accordance with the operation information received from input reception unit 16.

Figure 15:
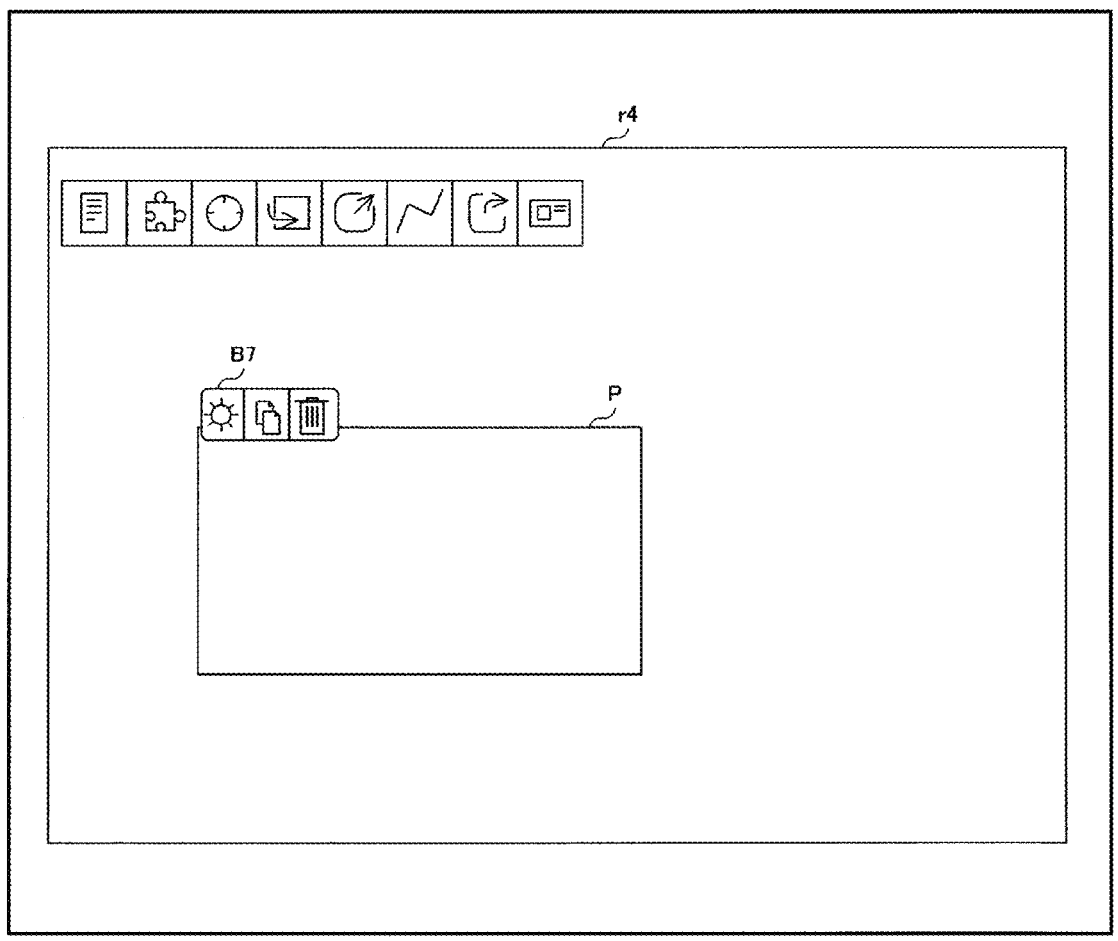
FIG. 15 is a diagram illustrating an example of a screen on which the display component is disposed on the layout screen in the management system according to the embodiment of the present disclosure.

FIG. 15 is a diagram illustrating an example of a screen in which a display component is disposed on a layout screen in the management system according to the embodiment of the present disclosure.

Referring to FIG. 15, the display component is disposed at a position P in region r4. The display component includes a button B7 for selecting content of the display component.

Confirmation screen creating unit 22 can select the content of the display component on the confirmation screen by setting one or more parameters in accordance with an instruction from the user.

For example, the user performs an operation of pressing button B7 to the Web browser.

For example, when receiving the operation by the user, input reception unit 16 outputs operation information indicating the content of the operation by the user to confirmation screen creating unit 22 in processing unit 14.

Based on the operation information received from input reception unit 16, confirmation screen creating unit 22 creates a content selection screen including a table Tab3 indicating display components created by display component creating unit 21, and outputs the created content selection screen to display processing unit 23.

Figure 16:
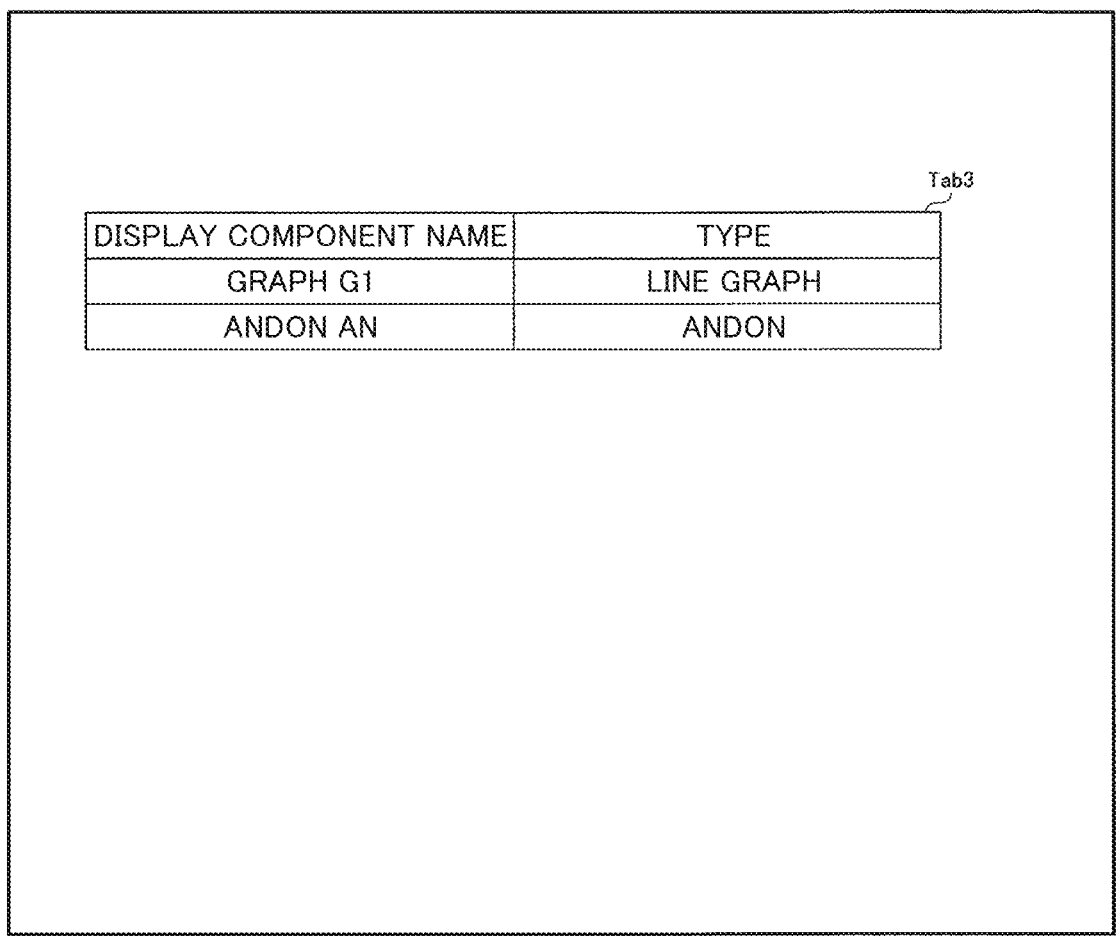
FIG. 16 is a diagram illustrating an example of a content selection screen displayed on the display in the management system according to the embodiment of the present disclosure.

FIG. 16 is a diagram illustrating an example of the content selection screen displayed on the display in the management system according to the embodiment of the present disclosure.

Referring to FIG. 16, table Tab3 illustrates a correspondence between one or more display components created by display component creating unit 21 and types of the display components.

Display processing unit 23 performs processing of displaying the content selection screen received from confirmation screen creating unit 22 on display 131.

The user performs, to the Web browser, an operation of selecting one display component, for example, graph G1 from table Tab3 on the content selection screen.

For example, upon receiving the operation by the user, input reception unit 16 outputs operation information indicating the content of the operation by the user to confirmation screen creating unit 22 in processing unit 14.

Confirmation screen creating unit 22 obtains a SQL instruction included in the display component information corresponding to graph G1 from storage unit 17 based on the operation information received from input reception unit 16.

Then, confirmation screen creating unit 22 creates an http post including the obtained SQL instruction and the URLc for access processing, and transmits the created http post to server 132B via data obtaining unit 11.

Upon receiving the http post from data visualization apparatus 101, server 132B obtains the SQL instruction included in the received http post, and performs at least one of processing of obtaining measurement data from database 133 or processing of calculation using the measurement data in database 133 in accordance with the obtained SQL instruction.

Then, server 132B creates an http response including target data which is at least one of the obtained measurement data or the calculation result of calculation using the measurement data, and transmits the http response to data visualization apparatus 101.

Upon receiving the http response from server 132B, data obtaining unit 11 in data visualization apparatus 101 obtains the target data included in the received http response, and outputs the obtained target data to confirmation screen creating unit 22 in processing unit 14.

Confirmation screen creating unit 22 then obtains, for example, an OSS library for drawing graph G1 from storage unit 17, and draws graph G1 based on the target data received from data obtaining unit 11 in the display component disposed on the layout screen using the obtained OSS library.

Figure 17:
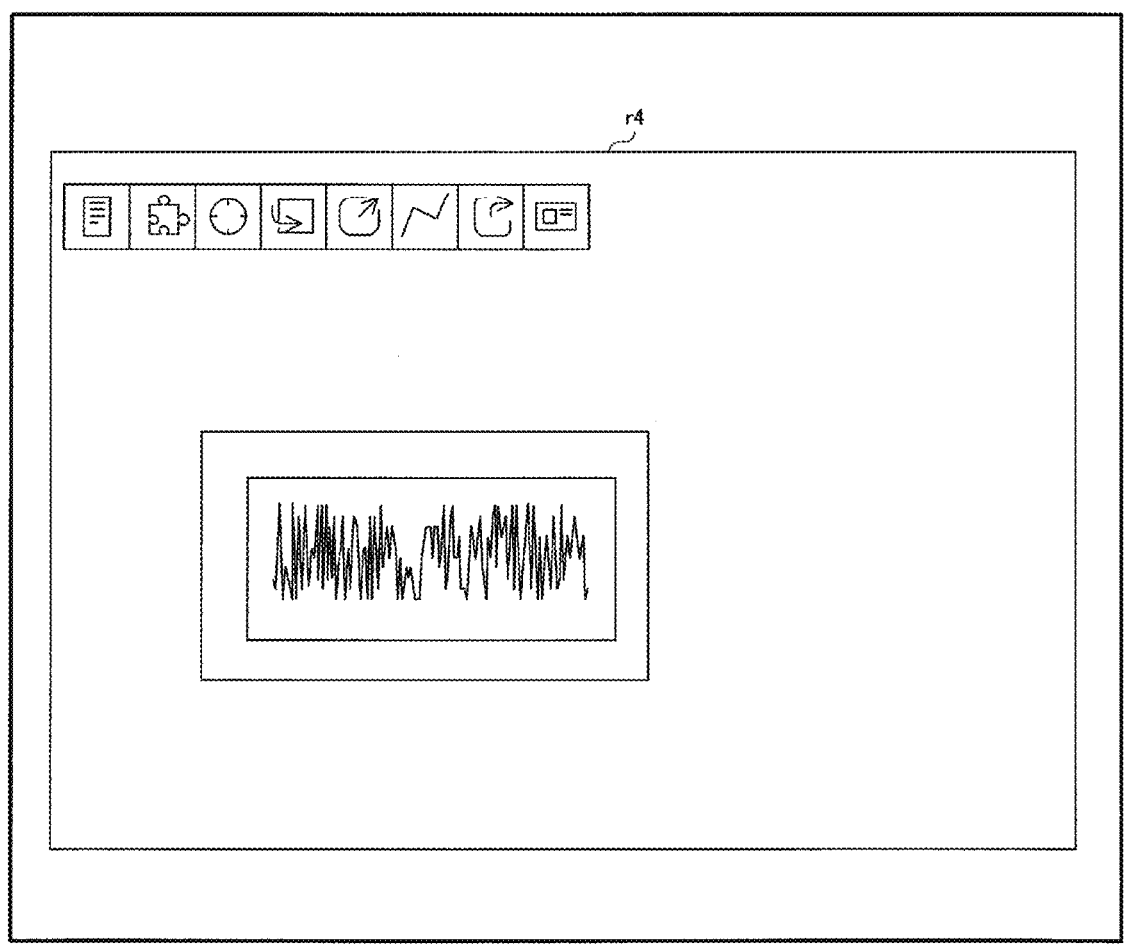
FIG. 17 is a diagram illustrating an example of a screen on which the display component is disposed in the layout screen in the management system according to the embodiment of the present disclosure.

FIG. 17 is a diagram illustrating an example of a screen on which a display component is disposed in the layout screen in the management system according to the embodiment of the present disclosure.

Referring to FIG. 17, graph G1 is disposed as a display component at position P illustrated in FIG. 15.

Confirmation screen creating unit 22 can dispose a plurality of display components on the layout screen by setting one or more parameters of the display components, for example.

More specifically, the user can create a layout screen in which one or more desired display components are disposed by repeatedly performing the above-described operation.

Figure 18:
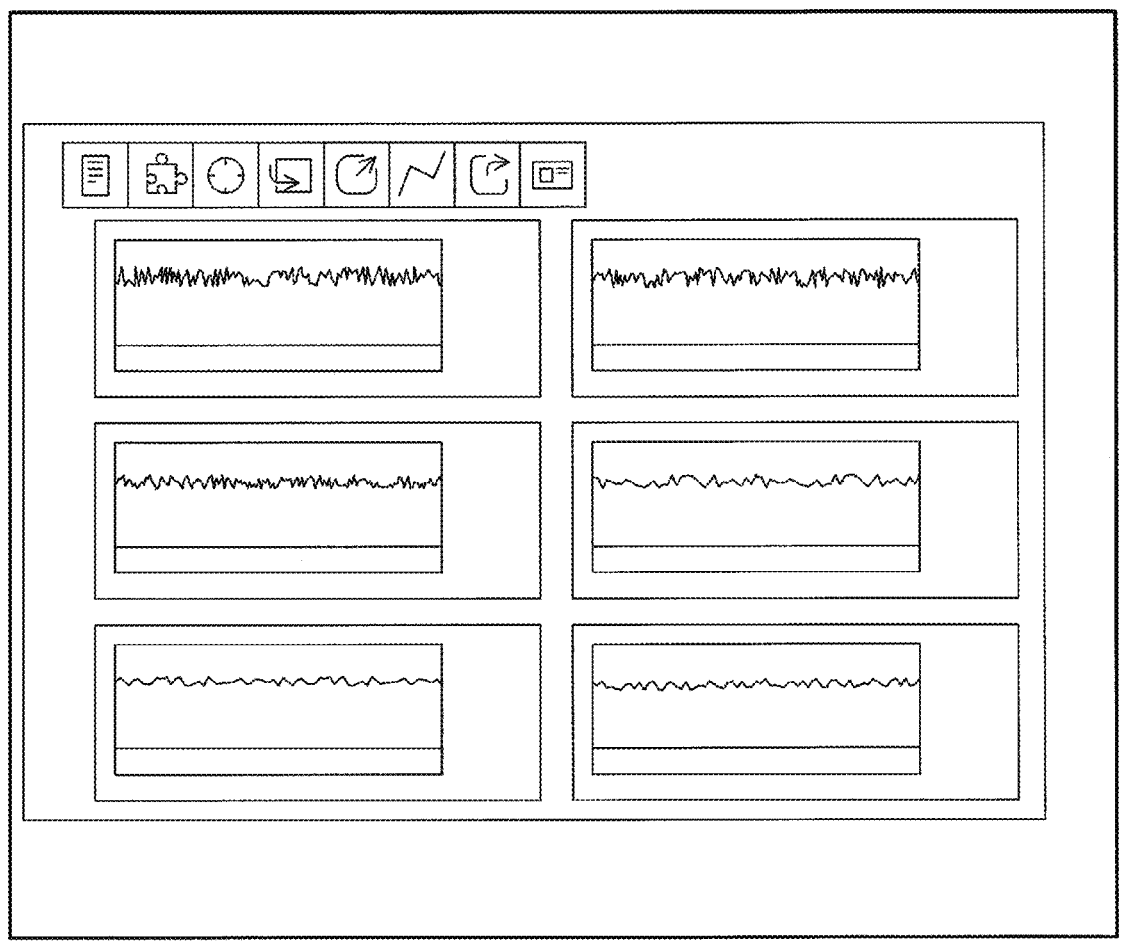
FIG. 18 is a diagram illustrating an example of a layout screen on which a plurality of display components are disposed in the management system according to the embodiment of the present disclosure.

FIG. 18 is a diagram illustrating an example of a layout screen in which a plurality of display components are disposed in the management system according to the embodiment of the present disclosure.

Referring to FIG. 18, a plurality of graphs G1 having one or more different parameters are disposed in region r4 of the layout screen.

For example, the user selects any one of the plurality of graphs G1 and performs an operation of changing a parameter of the selected graph G1 to the Web browser.

For example, upon receiving the operation by the user, input reception unit 16 outputs operation information indicating the content of the operation by the user to confirmation screen creating unit 22 in processing unit 14.

Confirmation screen creating unit 22 creates a parameter setting screen for changing parameters of graph G1 based on the operation information received from input reception unit 16, and outputs the created parameter setting screen to display processing unit 23.

Display processing unit 23 performs processing of displaying the parameter setting screen received from confirmation screen creating unit 22 on display 131.

Figure 19:
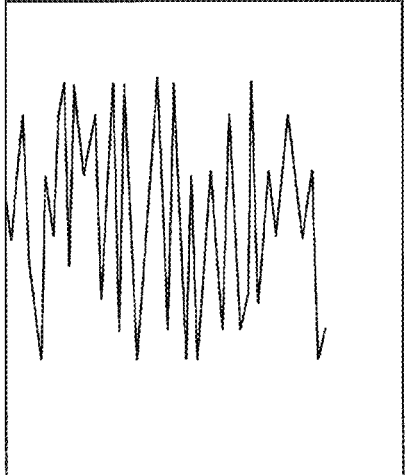
FIG. 19 is a diagram illustrating an example of a parameter setting screen in the management system according to the embodiment of the present disclosure.

FIG. 19 is a diagram illustrating an example of the parameter setting screen in the management system according to the embodiment of the present disclosure.

Referring to FIG. 19, the parameter setting screen includes an input field Ip31 for a graph title, an input field Ip32 for a legend, an input field Ip33 for a graph color, and an input field Ip34 for a shape.

The parameter setting screen includes, for example, an input field Ip35 for a temporal range of graph G1, an input field Ip36 for a unit of time of graph G1, and an input field Ip37 for inputting the type of calculation using measurement data in graph G1.

The parameter setting screen includes an input field Ip38 for a graph ID of graph G1 and an input field Ip39 for a graph name of graph G1.

Also, confirmation screen creating unit 22 limits the types of parameters that can be set on the parameter setting screen based on authority information received from authorization unit 15 described above.

Thus, confirmation screen creating unit 22 is granted narrower authority than display component creating unit 21 by authorization unit 15.

More specifically, confirmation screen creating unit 22 creates a parameter setting screen in which the input of input field Ip35 is limited, for example, in a case where the authority information having content for limiting the temporal range of measurement data to be obtained from database 133 is received from authorization unit 15.

That is, confirmation screen creating unit 22 is limited in authority for access processing.

Figure 20:
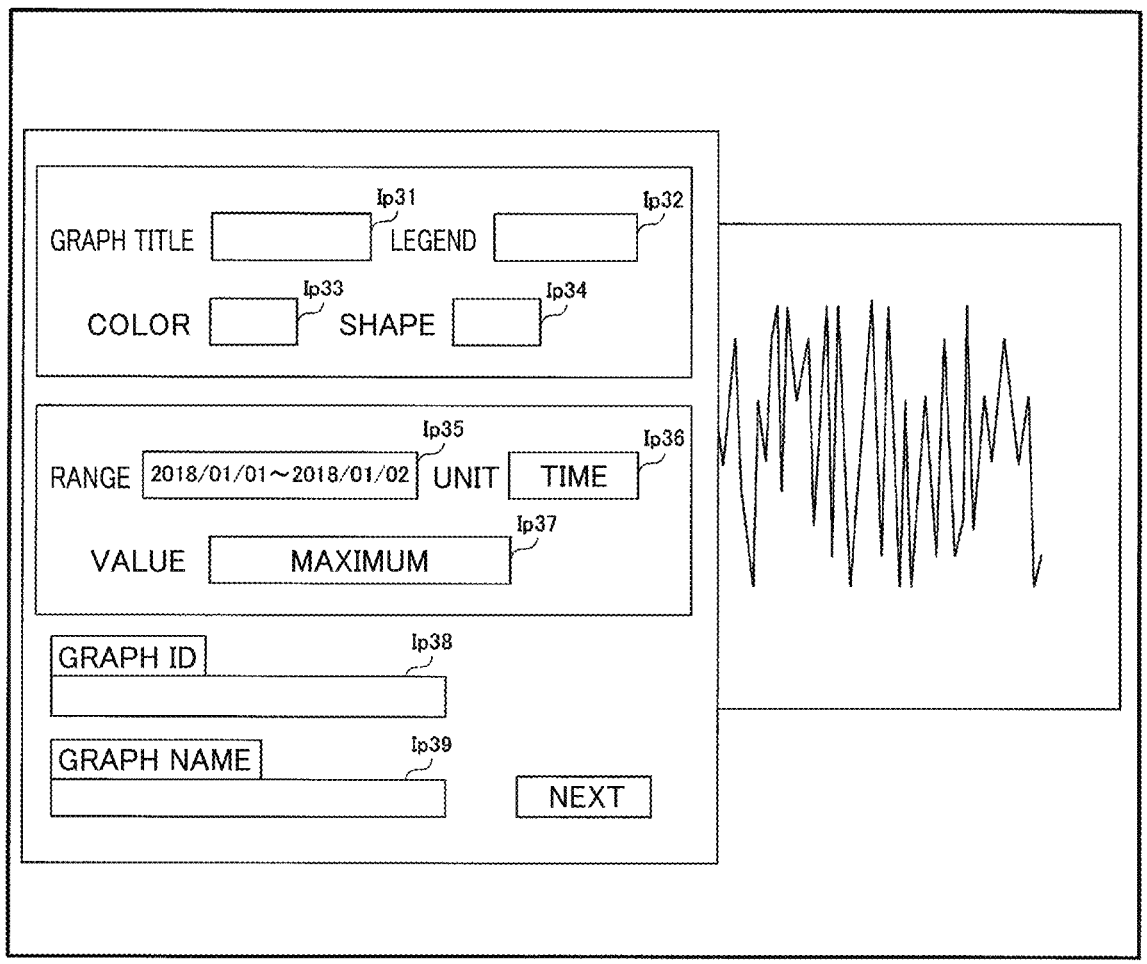
FIG. 20 is a diagram illustrating another example of a parameter setting screen in the management system according to the embodiment of the present disclosure.

FIG. 20 is a diagram illustrating another example of the parameter setting screen in the management system according to the embodiment of the present disclosure.

Referring to FIG. 20, in the parameter setting screen in the state where the authority for access processing is limited, for example, a fixed value is displayed in input field Ip35, as compared with the parameter setting screen illustrated in FIG. 19.

The parameter setting screen in the state in which the authority for access processing is limited is not limited to the display of the fixed value in input field Ip35, and input field Ip35 may not be displayed.

Referring again to FIGS. 1 and 19, when input reception unit 16 receives, for example, an operation of changing a parameter by a user, input reception unit 16 outputs operation information indicating the content of the operation by the user to confirmation screen creating unit 22 in processing unit 14.

Confirmation screen creating unit 22 obtains a SQL instruction included in the corresponding display component information from storage unit 17 based on the operation information received from input reception unit 16, and edits the corresponding parts in the SQL instruction in accordance with the changed parameters.

Confirmation screen creating unit 22 then creates an http post including the edited SQL instruction and the URLc for access processing, and transmits the created http post to server 132B via data obtaining unit 11.

Server 132B receives the http post from data visualization apparatus 101, obtains the SQL instruction included in the received http post, and performs at least one of processing of obtaining measurement data from database 133 or processing of calculation using the measurement data in database 133 in accordance with the obtained SQL instruction.

Server 132B then creates an http response including target data which is at least one of the obtained measurement data or the calculation result of calculation using the measurement data, and transmits the http response to data visualization apparatus 101.

Upon receiving the http response from server 132B, data obtaining unit 11 in data visualization apparatus 101 obtains the target data included in the received http response, and outputs the obtained target data to confirmation screen creating unit 22 in processing unit 14.

Then, confirmation screen creating unit 22 obtains, for example, an OSS library for drawing graph G1 from storage unit 17, and draws graph G1 based on the target data received from data obtaining unit 11 in the display component disposed in the layout screen by using the obtained OSS library.

Further, confirmation screen creating unit 22 stores the created confirmation screen in storage unit 17 in accordance with, for example, an operation by a user.

More specifically, for example, in the layout screen illustrated in FIG. 18, the user performs an operation for saving the layout screen to the Web browser.

For example, when receiving the operation by the user, input reception unit 16 outputs operation information indicating the content of the operation by the user to confirmation screen creating unit 22 in processing unit 14.

Based on the operation information received from input reception unit 16, confirmation screen creating unit 22 stores, in storage unit 17, confirmation screen information including each of the content of the SQL instruction and the set parameters of one or more display components included in the layout screen.

Thus, the new confirmation screen created by confirmation screen creating unit 22 and button B1 for displaying the confirmation screen on display 131 are added to confirmation screen table Tab1 on the top screen illustrated in FIG. 5. Thus, confirmation screen creating unit 22 can create a plurality of confirmation screens.

[Viewing of Confirmation Screen]

A user whose type is a viewer, a confirmation screen creator, or a display component creator performs, for example, an operation of pressing button B1 corresponding to "confirmation screen 1" on the top screen illustrated in FIG. 5 using a keyboard, a mouse, or the like to the Web browser.

Referring again to FIG. 1, when input reception unit 16 receives the operation by the user, for example, input reception unit 16 outputs operation information indicating the content of the operation by the user to processing unit 14.

Based on the operation information received from input reception unit 16, processing unit 14 transmits an http request including the URLd for creating a confirmation screen to server 132A via data obtaining unit 11 based on the operation information received from input reception unit 16.

Upon receiving the http request from data visualization apparatus 101, server 132A transmits an http response including an HTML file storing a display program to data visualization apparatus 101 based on the received http request.

When processing unit 14 in data visualization apparatus 101 receives the HTML file included in the http response from server 132A via data obtaining unit 11, processing unit 14 obtains the display program from the received HTML file.

Processing unit 14 also obtains confirmation screen information corresponding to "confirmation screen 1" from storage unit 17 based on the operation information received from input reception unit 16. Then, processing unit 14 reflects the obtained confirmation screen information on the obtained display program and executes the display program.

As a result, a layout screen corresponding to the confirmation screen information is displayed on display 131.

Further, for example, confirmation screen creating unit 22 can create a confirmation screen in which a plurality of types of display components are disposed by setting one or more parameters, based on authority set by a user's operation and authorization unit 15.

Figure 21:
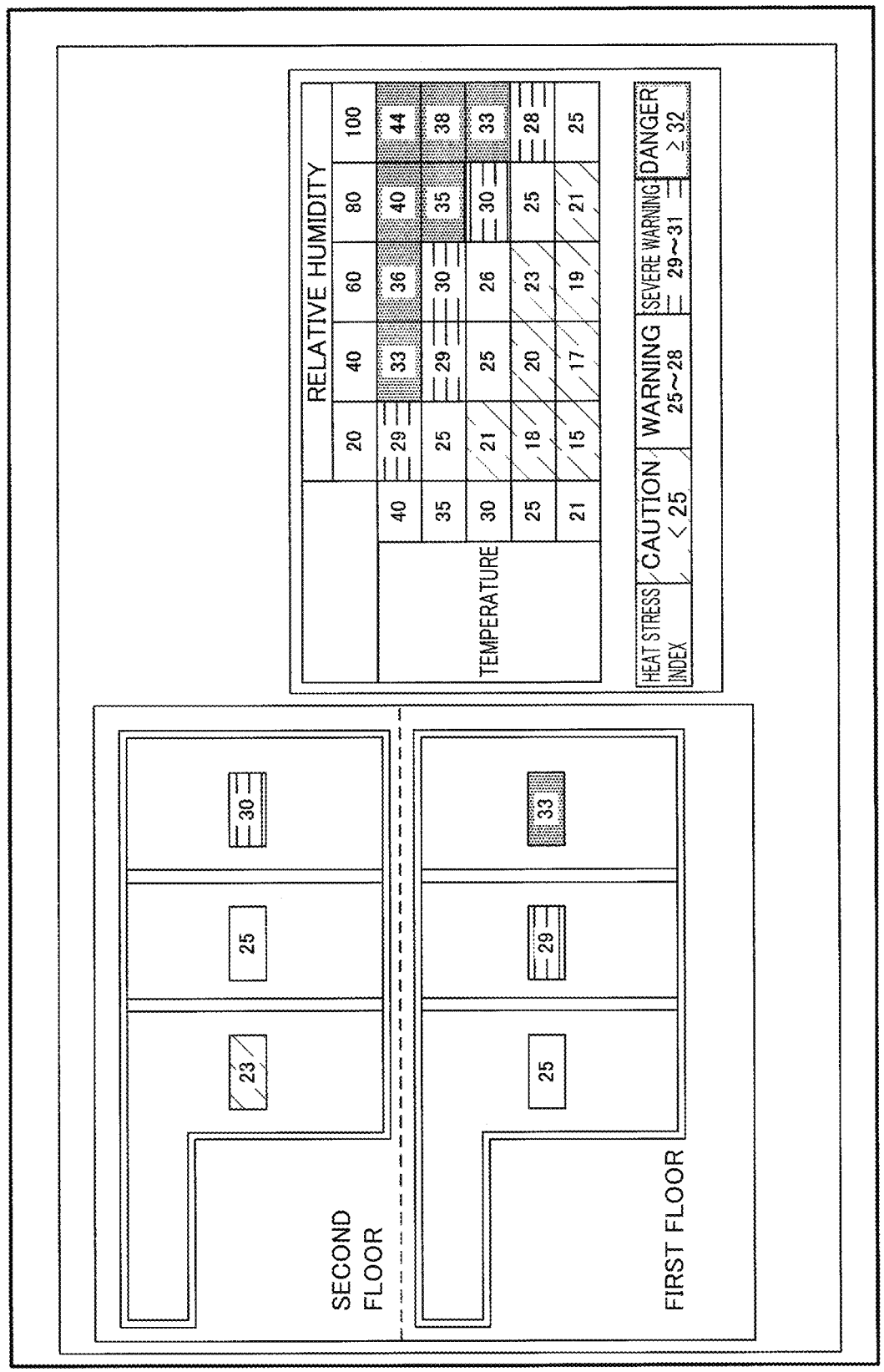
FIG. 21 is a diagram illustrating an example of a layout screen on which a plurality of types of display components are disposed in the management system according to the embodiment of the present disclosure.

FIG. 21 is a diagram illustrating an example of a layout screen in which a plurality of types of display components are disposed in the management system according to the embodiment of the present disclosure.

Referring to FIG. 21, the layout screen includes, for example, the WBGT table illustrated in FIG. 11, the Andons An illustrated in FIG. 12, and the map information illustrated in FIG. 13.

In the layout screen, heat stress indices at a plurality of locations in the two storied factory are indicated using Andons An.

The user can check heat stress indices and classes of the heat stress indices at the plurality of locations in the two storied factory by using the layout screen, for example.

Figure 22:
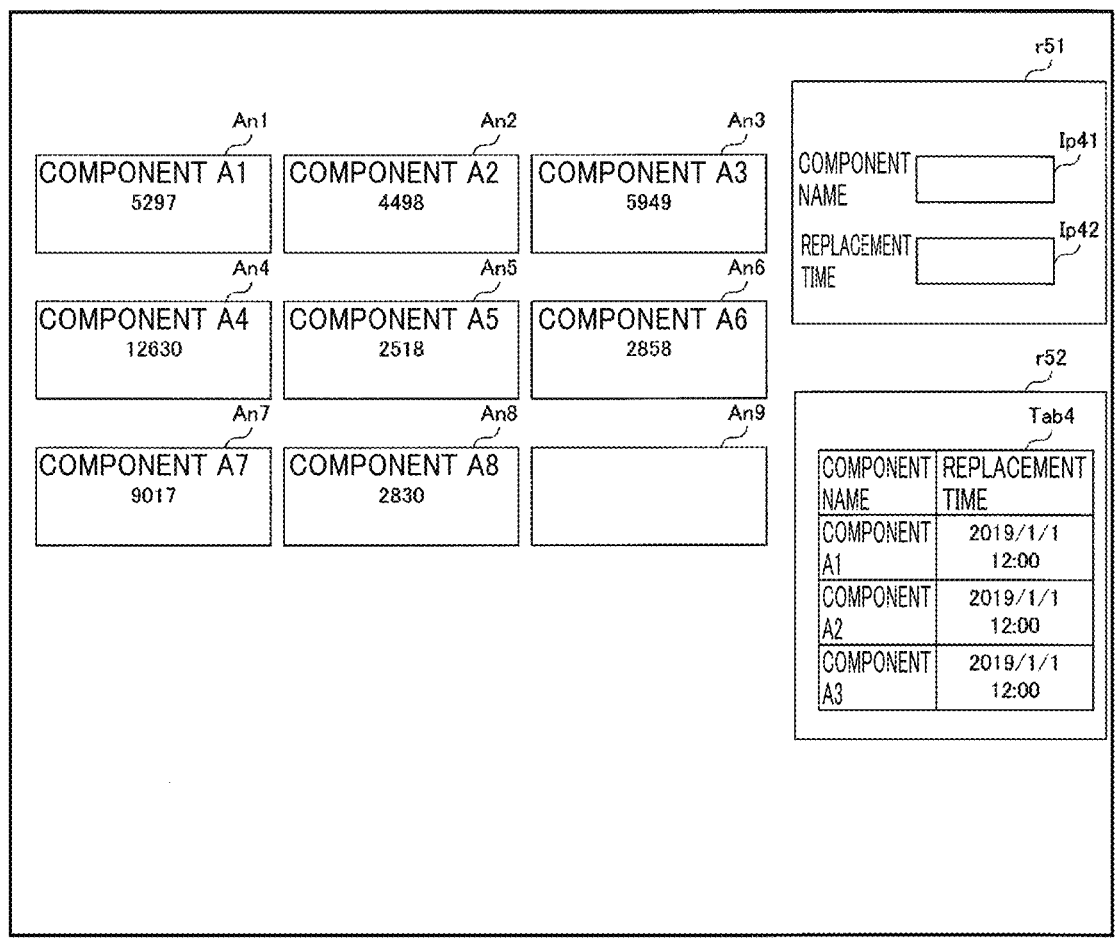
FIG. 22 is a diagram illustrating an example of a layout screen on which a plurality of types of display components are disposed in the management system according to the embodiment of the present disclosure.

FIG. 22 is a diagram illustrating an example of a layout screen in which a plurality of types of display components are disposed in the management system according to the embodiment of the present disclosure.

The layout screen illustrated in FIG. 22 is used, for example, to manage operating time of a plurality of components.

Referring to FIG. 22, the layout screen includes Andons An1 to An9 created by display component creating unit 21.

Andon An1 indicates that an operating time of a component A1 is 5297 hours. Andon An2 indicates that an operating time of a component A2 is 4498 hours. Andon An3 indicates that an operating time of a component A3 is 5949 hours. Andon An4 indicates that an operating time of a component A4 is 12630 hours. Andon An5 indicates that an operating time of a component A5 is 2518 hours. Andon An6 indicates that an operating time of a component A6 is 2858 hours. Andon An7 indicates that an operating time of a component A7 is 9017 hours. Andon An8 indicates that an operating time of a component A8 is 2830 hours. Andon An9 is an unset Andon.

In addition, a region r51 on the upper right side of Andons An1 to An 9 in the layout screen includes an input field Ip41 for a component name and an input field Ip42 for a replacement time corresponding to an operation start time of the component as parameters of each of the Andons.

In addition, a region r52 on the lower right side of Andons An1 to An9 in the layout screen includes a table Tab4 indicating a correspondence between component name and replacement time of each of the components.

Referring again to FIG. 1, when input reception unit 16 receives, for example, an operation of inputting the component name into input field Ip41 and an operation of inputting the operation start time of the component into input field Ip42 by a user, input reception unit 16 outputs operation information indicating content of the operations by the user to confirmation screen creating unit 22 in processing unit 14.

Confirmation screen creating unit 22 obtains a SQL instruction included in display component information corresponding to the component name inputted by the user from storage unit 17 based on the operation information received from input reception unit 16, and edits a part corresponding to the operation start time in the obtained SQL instruction to the operation start time inputted by the user.

Then, confirmation screen creating unit 22 creates an http post including the edited SQL instruction and the URLc for access processing, and transmits the created http post to server 132B via data obtaining unit 11.

Server 132B receives the http post from data visualization apparatus 101, obtains the SQL instruction included in the received http post, and calculates an operating time of the corresponding component by subtracting the operation start time indicated by the SQL instruction from the current time in accordance with the obtained SQL instruction.

Then, server 132B creates an http response including the operating time calculated as target data and transmits the http response to data visualization apparatus 101.

Upon receiving the http response from server 132B, data obtaining unit 11 in data visualization apparatus 101 obtains the target data included in the received http response, and outputs the obtained target data to confirmation screen creating unit 22 in processing unit 14.

Then, confirmation screen creating unit 22 obtains, for example, an OSS library for drawing Andon An from storage unit 17, and draws Andon An based on the target data received from data obtaining unit 11 on a display component disposed on the layout screen using the obtained OSS library.

In addition, confirmation screen creating unit 22 obtains, for example, an OSS library for drawing a table from storage unit 17, and draws a table Tab4 based on the target data received from data obtaining unit 11 on a display component disposed on the layout screen using the obtained OSS library.

FIG. 23 is a diagram illustrating an example of a layout screen in which a plurality of types of display components are disposed in the management system according to the embodiment of the present disclosure.

The layout screen illustrated in FIG. 23 is used, for example, to check current or power values in a plurality of types of products and components in a certain period of time.

Referring to FIG. 23, the upper part of the layout screen includes, in order from left to right, a input field for a display period, a table created by display component creating unit 21 for selecting a product type, a table created by display component creating unit 21 for selecting a component name, and a table created by display component creating unit 21 for selecting an item to be displayed.

The lower part of the layout screen includes an image indicating information corresponding to the selected product type, component name, and item.

Figure 24:
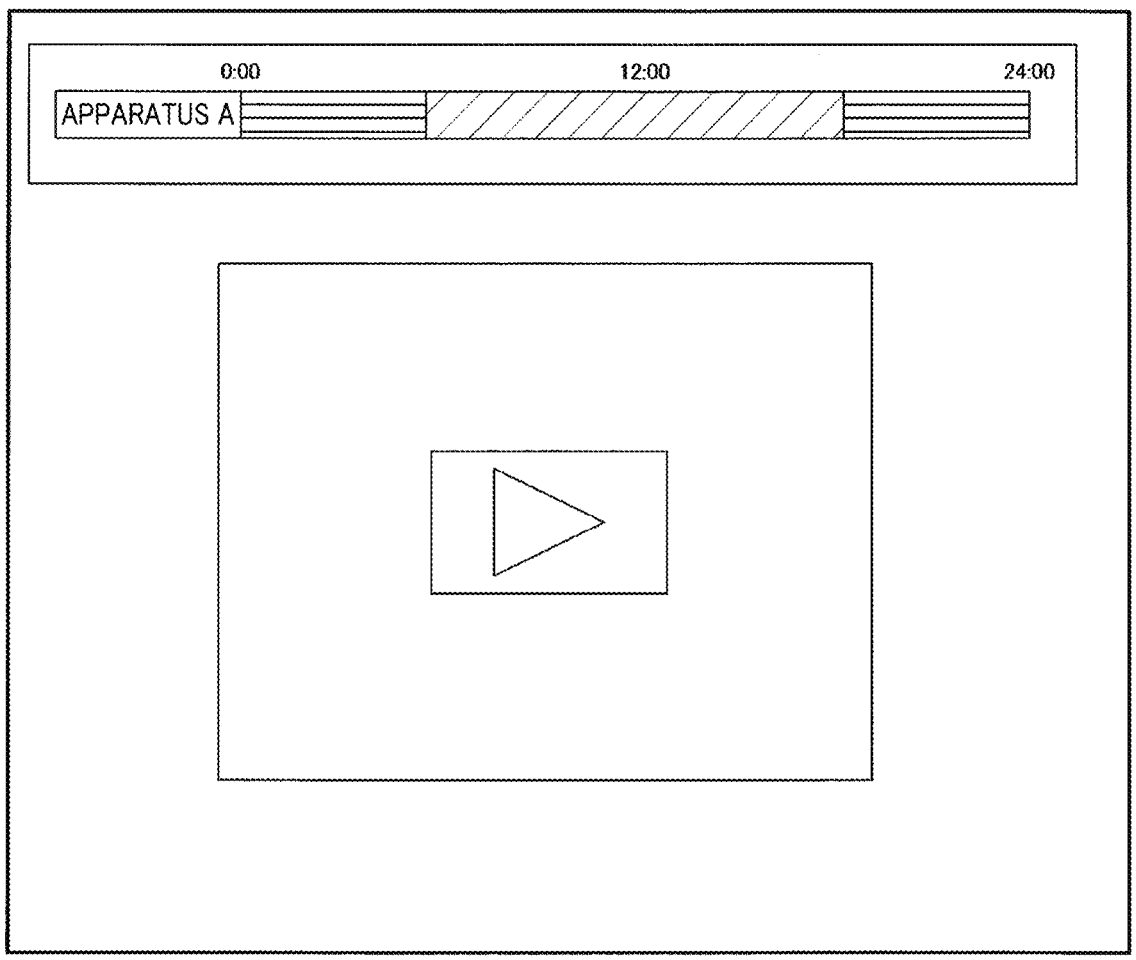
FIG. 24 is a diagram illustrating an example of a layout screen on which a plurality of types of display components are disposed in the management system according to the embodiment of the present disclosure.

FIG. 24 is a diagram illustrating an example of a layout screen in which a plurality of types of display components are disposed in the management system according to the embodiment of the present disclosure.

The layout screen illustrated in FIG. 24 is used, for example, for a user to confirm a state of a certain device using a video.

Referring to FIG. 24, the layout screen includes, for example, a Gantt chart in which a horizontal axis is a time axis, indicating an operating state of a certain apparatus in a factory to be managed, and a display component (hereinafter also referred to as a video component) for playing back a captured video of the apparatus captured by a camera installed in the factory.

Figure 25:
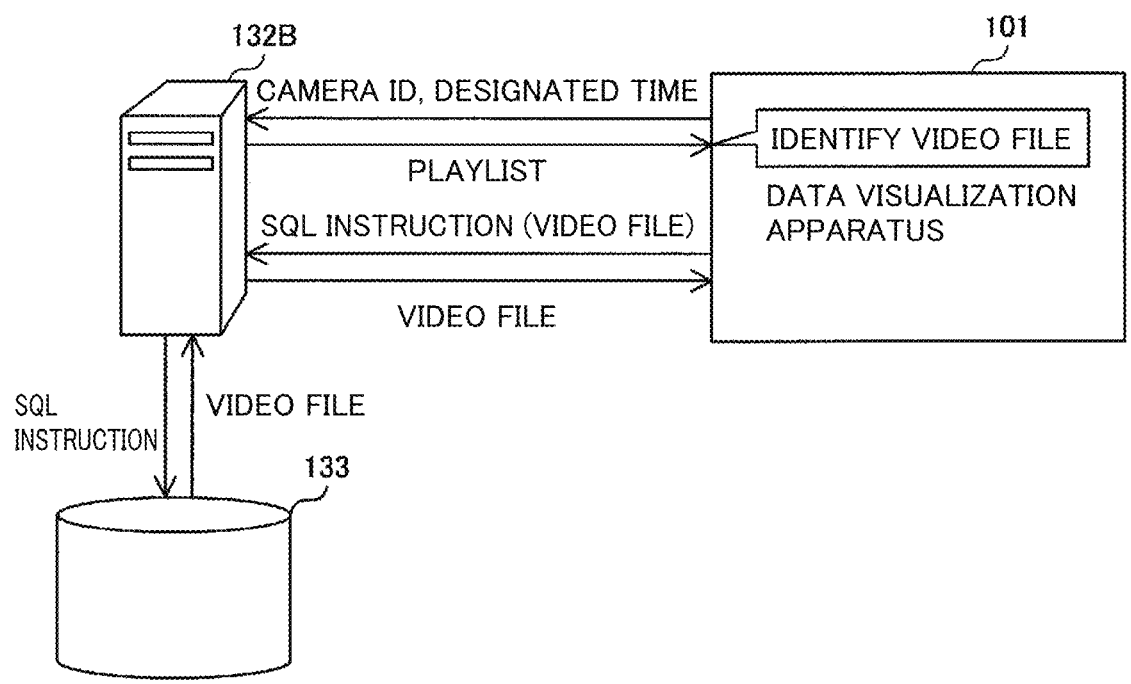
FIG. 25 is a diagram schematically illustrating a use of video in the management system according to the embodiment of the present disclosure.

FIG. 25 is a diagram schematically illustrating a method of using a video in the management system according to the embodiment of the present disclosure.

Referring to FIGS. 25 and 1, when input reception unit 16 receives, for example, an operation of selecting a part of Gantt chart by a user, input reception unit 16 outputs operation information including an ID of the above apparatus (hereinafter, also referred to as an apparatus ID) and a time corresponding to the part of Gantt chart selected by the user (hereinafter, also referred to as a designated time) to confirmation screen creating unit 22.

Confirmation screen creating unit 22 receives the operation information from input reception unit 16 and obtains the apparatus ID and the designated time included in the received operation information.

Then, confirmation screen creating unit 22 identifies an ID of a camera (hereinafter also referred to as a camera ID) that is associated with the obtained apparatus ID, and creates an SQL instruction for requesting a playlist which is in accordance with an HTTP Live Streaming (HLS) format and includes the identified camera ID and the obtained designated time.

Confirmation screen creating unit 22 creates an http post including the created SQL instruction, and transmits the created http post to server 132B via data obtaining unit 11.

Server 132B receives the http post from data visualization apparatus 101, obtains the SQL instruction included in the received http post, and obtains the playlist indicated by the obtained SQL instruction from database 133.

Then, server 132B creates an http response including the playlist obtained as target data and transmits the http response to data visualization apparatus 101.

Upon receiving the http response from server 132B, data obtaining unit 11 in data visualization apparatus 101 obtains the target data included in the received http response, and outputs the obtained target data to confirmation screen creating unit 22 in processing unit 14.

Confirmation screen creating unit 22 analyzes the playlist, that is, the target data received from data obtaining unit 11 to specify a video file indicated by the playlist.

Then, confirmation screen creating unit 22 obtains the SQL instruction included in the display component information of the video component from storage unit 17, and edits a part corresponding to the video file in the obtained SQL instruction to the specified video file.

Subsequently, confirmation screen creating unit 22 creates an http post including the edited SQL instruction and the URLc for access processing, and transmits the created http post to server 132B via data obtaining unit 11.

Server 132B receives the http post from data visualization apparatus 101, obtains the SQL instruction included in the received http post, and obtains the video file indicated by the obtained SQL instruction from database 133.

Then, server 132B creates an http response including the video file obtained as target data and transmits the http response to data visualization apparatus 101.

Upon receiving the http response from server 132B, data obtaining unit 11 in data visualization apparatus 101 obtains the target data included in the received http response, and outputs the obtained target data to confirmation screen creating unit 22 in processing unit 14.

Then, confirmation screen creating unit 22 obtains, for example, an OSS library for drawing a video component from storage unit 17, and draws the video component based on the target data received from data obtaining unit 11 on the layout screen using the obtained OSS library.

Further, for example, processing unit 14 performs processing of further displaying a time taken for the access processing on the confirmation screen.

More specifically, confirmation screen creating unit 22 in processing unit 14 measures, for example, a data obtaining time taken for access processing and a drawing time taken for disposing a display component, and outputs, to display processing unit 23, a layout screen on which the data obtaining time and the drawing time are displayed as measurement results, respectively.

Specifically, confirmation screen creating unit 22 transmits the http post including the SQL instruction and the URLc for access processing to server 132B via data obtaining unit 11, and also starts measuring time.

When confirmation screen creating unit 22 receives the target data included in the http response from server 132B for the http post, confirmation screen creating unit 22 stops measuring the time and obtains the measured time as the data obtaining time.

Confirmation screen creating unit 22 measures a time from the reception of the target data to the completion of the creation of the layout screen.

Specifically, when confirmation screen creating unit 22 receives the target data, confirmation screen creating unit 22 starts measuring time.

Then, when the creation of the layout screen is completed based on the target data, confirmation screen creating unit 22 stops measuring time and obtains the measured time as the drawing time.

Subsequently, confirmation screen creating unit 22 creates a layout screen in which the data obtaining time and the drawing time are displayed as measurement results, respectively.

Display processing unit 23 performs processing for displaying the layout screen received from confirmation screen creating unit 22 on display 131.

Figure 26:
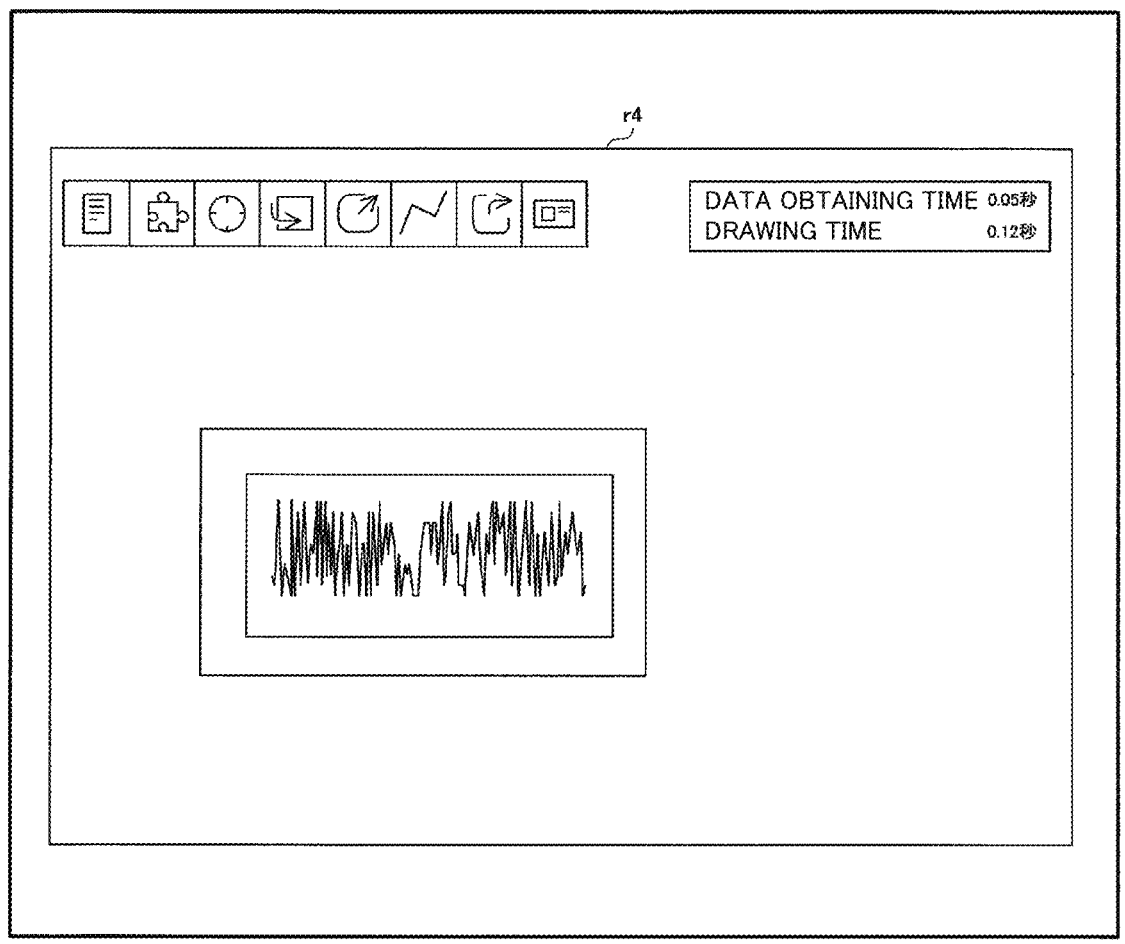
FIG. 26 is a diagram illustrating an example of a layout screen on which each of measurement results in the management system according to the embodiment of the present disclosure is displayed.

FIG. 26 is a diagram illustrating an example of a layout screen on which each of measurement results in the management system according to the embodiment of the present disclosure is displayed.

Referring to FIG. 26, each of the measurement results is displayed, for example, in an upper right portion of region r4 on the layout screen.

Confirmation screen creating unit 22 is not limited to a configuration of measuring the data obtaining time and the drawing time, and may be configured to measure at least one of the data obtaining time or the drawing time.

In FIG. 1, confirmation screen creating unit 22 outputs each of the measurement results to restriction unit 18.

For example, restriction unit 18 limits at least one of a time taken to perform access processing once or the number of times of the access processing per certain time in a state in which the access processing by confirmation screen creation unit 22 is permitted, that is, in a state in which confirmation screen creating unit 22 is granted the authority for the access processing.

Restriction unit 18 makes a predetermined notification when a corresponding predetermined condition is satisfied by at least one of the time taken to perform the access processing once or the number of times of the access processing per certain time.

More specifically, for example, when each of the measurement results received from confirmation screen creating unit 22, that is, at least one of the data obtaining time or the drawing time is equal to or longer than a predetermined time, restriction unit 18 outputs, to processing unit 14, a warning indicating that the required time has been exceeded.

Confirmation screen creating unit 22 outputs, for example, the number of times of access processing performed within the predetermined time to restriction unit 18.

For example, when the number of times of access processing received from confirmation screen creating unit 22 is equal to or more than a predetermined number of times, restriction unit 18 outputs, to processing unit 14, a warning indicating that the number of times of access processing exceeds the predetermined number of times.

Processing unit 14 receives each of the warnings from restriction unit 18 and sends, for example, an e-mail with the content indicated by each of the warnings to a PC or the like used by a user.

[User Management Processing]

When a user is a system administrator, for example, the user can perform user management processing by performing a predetermined operation to data visualization apparatus 101 using a keyboard, a mouse, or the like. For example, a user management table indicating a correspondence between a plurality of user IDs and corresponding user types is registered in database 133.

When the predetermined operation is performed, input reception unit 16 outputs operation information indicating the content of the operation by the user to processing unit 14.

Based on the operation information received from input reception unit 16, processing unit 14 creates an http post including a SQL instruction with content for requesting the plurality of user IDs and the corresponding user types (hereinafter collectively referred to as user data) included in the user management table, and the URLc for access processing, and transmits the created http post to server 132B via data obtaining unit 11.

Server 132B receives the http post from data visualization apparatus 101, obtains the SQL instruction included in the received http post, and obtains the user data from the user management table in database 133 in accordance with the obtained SQL instruction.

Then, server 132B creates an http response including the obtained user data and transmits the http response to data-visualization apparatus 101.

Upon receiving the http response from server 132B, data obtaining unit 11 in data-visualization apparatus 101 obtains the user data included in the received http response and outputs the user data to processing unit 14.

Based on the user data received from data obtaining unit 11, processing unit 14 creates a user management table indicating a correspondence between the plurality of user IDs and the corresponding user types, and performs processing of displaying a screen including the created user management table on display 131.

For example, the user performs, to data visualization apparatus 101, an operation of performing processing such as addition, change, and deletion of at least one of the user ID or the user type to the user management table on the screen displayed on display 131.

When the operation is performed, input reception unit 16 outputs operation information indicating the content of the operation by the user to processing unit 14.

Based on the operation information received from input reception unit 16, processing unit 14 creates an SQL instruction with content updating the user management table in the database 133, creates an http post including the created SQL instruction and the URLc for access processing, and transmits the created http post to server 132B via data obtaining unit 11.

Server 132B receives the http post from data visualization apparatus 101, obtains the SQL instruction included in the received http post, and updates the user management table in database 133 in accordance with the obtained SQL instruction.

In this way, in data visualization apparatus 101, the user can create various display components in accordance with various applications.

In addition, in data visualization apparatus 101, since the user can easily create various confirmation screens corresponding to various applications by using display components, the user can easily grasp states of components, apparatus, buildings, and the like to be managed.

Further, in data visualization apparatus 101, since various authority can be set for processing using the database in accordance with the type of user, appropriate authority can be set in accordance with the type of user. As a result, for example, an increase in the processing load of database 133 can be suppressed, and database 133 can be used more smoothly even by a user having little knowledge about the database.

[Flow of Operation]

Each of a plurality of apparatus in management system 201 includes a computer including a memory, and an arithmetic processing unit such as a CPU in the computer reads a program including a part or all of each step of the following flowchart from the memory to execute the program. Each program of the plurality of apparatus can be installed from the outside. Each program of the plurality of apparatus is distributed in a form of being stored in a recording medium.

Figure 27:
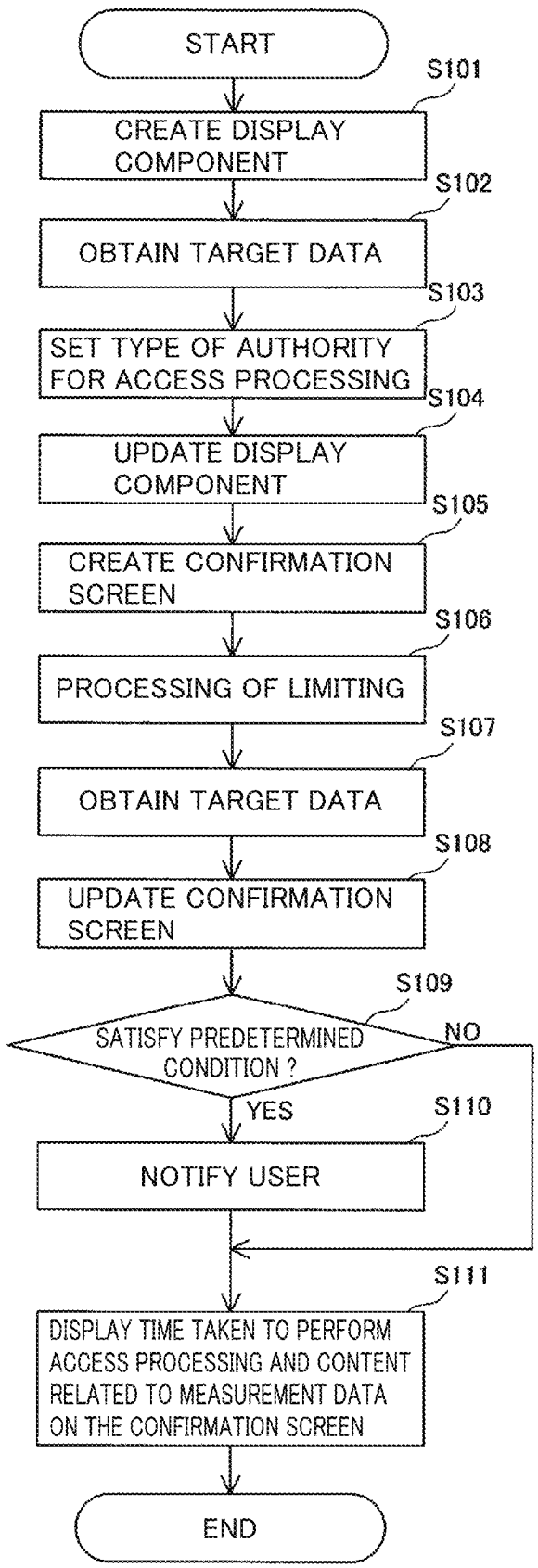
FIG. 27 is a flowchart defining an operation procedure when the data visualization apparatus in the management system according to the embodiment of the present disclosure displays a confirmation screen on the display.

FIG. 27 is a flowchart defining an operation procedure when the data visualization apparatus in the management system according to the embodiment of the present disclosure displays a confirmation screen on the display.

Referring to FIG. 27, data visualization apparatus 101 creates a display component in accordance with an operation by a user (step S101).

Next, data visualization apparatus 101 obtains target data, which is at least one of measurement data or a calculation result of calculation using the measurement data, from database 133 via server 132B in accordance with an operation by the user (step S102).

Subsequently, data visualization apparatus 101 sets a plurality of types of authority for access processing including at least any one of authority to set a temporal range of the measurement data to be obtained from database 133, authority to set a unit of time of the measurement data to be obtained from database 133, or authority to set a type of calculation using the measurement data, in accordance with an operation by the user (step S103).

Then, data visualization apparatus 101 updates the display component based on the obtained target data in accordance with an operation by the user (step S104).

Next, in accordance with an operation by the user, data visualization apparatus 101 creates a confirmation screen in which the created or updated display component is disposed (step S105).

Further, data visualization apparatus 101 performs processing of limiting at least one of a time taken to perform access processing once or the number of times of the access processing per certain time to less than a predetermined time limit or less than a predetermined number of times limit, respectively (step S106).

Next, data visualization apparatus 101 obtains target data from database 133 via server 132B in accordance with the authority for access processing set in accordance with an operation of the user (step S107).

Then, data visualization apparatus 101 updates the confirmation screen based on the obtained target data according to an operation of the user (step S108).

Next, when a predetermined condition set in the processing of limiting is satisfied in the access processing, for example, when at least one of the time taken to perform access processing once or the number of times of the access processing per certain time is equal to or greater than the time limit or equal to or greater than the number of times limit, respectively (YES in step S109), data visualization apparatus 101 notifies the user (step S110).

Subsequently, data visualization apparatus 101 performs processing for displaying the time taken to perform the access processing and content related to the measurement data on the confirmation screen (step S111).

On the other hand, when the time taken to perform the access processing once and the number of times of the access processing per certain time are less than the time limit and less than the number of times limit, respectively (NO in step S109), data visualization apparatus 101 performs processing for displaying the time taken to perform the access processing and the content related to the measurement data on the confirmation screen (step S111).

In management system 201 according to the embodiment of the present disclosure, each of servers 132A, 132B and database 133 is a single apparatus, but the present disclosure is not limited thereto. Some or all of the functions of servers 132A, 132B and database 133 may be provided by cloud computing. That is, each of servers 132A, 132B and database 133 may be configured by a plurality of cloud servers or the like.

In management system 201 according to the embodiment of the present disclosure, the number of types of users is four, but the present disclosure is not limited thereto. The number of types of users may be two, three, or five or more.

In data visualization apparatus 101 according to the embodiment of the present disclosure, processing unit 14 is configured to display a top screen corresponding to the type of user on display 131. However, the configuration is not limited thereto. Processing unit 14 may be configured to display a top screen common to all types of user on display 131.

In this case, for example, when a user performs, to data visualization apparatus 101, an operation that is not permitted to the type of the user, data visualization apparatus 101 performs processing for displaying, on display 131, a message indicating that the operation is not permitted.

In data visualization apparatus 101 according to the embodiment of the present disclosure, authorization unit 15 is configured to grants narrower authority to confirmation screen creating unit 22 than to display component creating unit 21, but the present disclosure is not limited thereto. Authorization unit 15 may be configured to grant the same range of authority to confirmation screen creating unit 22 as that of display component creation unit 21.

In data visualization apparatus 101 according to the embodiment of the present disclosure, authorization unit 15 is configured to grant narrower authority to display processing unit 23 than to confirmation screen creating unit 22, but the present disclosure is not limited thereto. Authorization unit 15 may be configured to grant the same range of authority to display processing unit 23 as that of confirmation screen creating unit 22.

In data visualization apparatus 101 according to the embodiment of the present disclosure, authorization unit 15 is configured to grant authority including at least any one of authority to set a temporal range of the measurement data to be obtained from the database, authority to set a unit of time of the measurement data to be obtained from the database, or authority to set a type of calculation using the measurement data, but the configuration is not limited thereto. Authorization unit 15 may be configured to grant authority to set other than the above.

In addition, in data visualization apparatus 101 according to the embodiment of the present disclosure, restriction unit 18 is configured to limit at least one of a time taken to perform access processing once or the number of times of the access processing per certain time, but the configuration is not limited thereto. Restriction unit 18 may be configured not to limit the time taken to perform access processing once and the number of times of the access processing per certain time.

In addition, in data visualization apparatus 101 according to the embodiment of the present disclosure, restriction unit 18 is configured to make a predetermined notification when a corresponding predetermined condition is satisfied by at least one of the time taken to perform the access processing once or the number of times of the access processing per certain time, but the configuration is not limited thereto. Restriction unit 18 may be configured not to make the predetermined notification.

In management system 201 according to the embodiment of the present disclosure, processing unit 14 in data visualization apparatus 101 is configured to send an e-mail with the content indicated by each of the warnings received from restriction unit 18 to a PC or the like used by a user, but the configuration is not limited thereto. In management system 201, an apparatus other than data visualization apparatus 101, for example, server 132B may be configured to send the e-mail to the PC or the like used by the user.

More specifically, restriction unit 18 in data visualization apparatus 101 outputs, for example, a predetermined condition related to the access processing to processing unit 14.

Processing unit 14 creates an SQL instruction indicating the predetermined condition received from restriction unit 18, creates an http post including the created SQL instruction and the URLc for access processing, and transmits the created http post to server 132B via data obtaining unit 11.

Server 132B receives the http post from processing unit 14, obtains the predetermined condition indicated by the SQL instruction included in the received http post, and retains the obtained predetermined condition.

When the processing of server 132B corresponds to the predetermined condition, server 132B sends an e-mail indicating that the processing corresponds to the predetermined condition to a PC or the like used by a user.

In data visualization apparatus 101 according to the embodiment of the present disclosure, processing unit 14 is configured to display a time taken for access processing on a confirmation screen, but the configuration is not limited thereto. Processing unit 14 may be configured not to display the time taken for the access processing on the confirmation screen.

Only a limited number of people have knowledge about databases, and it is not easy for people who do not have sufficient expertise about databases to smoothly use databases using database languages.

On the other hand, in data visualization apparatus 101 according to the embodiment of the present disclosure, data obtaining unit 11 obtains target data which is at least one of measurement data obtained from database 133 in which the measurement data based on measurement results is accumulated or a calculation result using the measurement data in database 133. Based on the target data obtained by data obtaining unit 11, processing unit 14 performs processing for displaying the content related to the measurement data on the confirmation screen. Authorization unit 15 can set a plurality of types of authority for access processing which is at least one of obtaining the measurement data from database 133 or calculation using the measurement data in database 133.

With this configuration, since various authority can be set for processing using database 133 in accordance with the type of user, it is possible to set appropriate authority in accordance with the type of user, and an increase in the processing load of database 133 can be suppressed.

Therefore, in data visualization apparatus 101 according to the embodiment of the present disclosure, the database can be more smoothly used in a configuration in which the measurement data obtained from database 133 is visualized.

In data visualization apparatus 101 according to the embodiment of the present disclosure, in processing unit 14, display component creating unit 21 creates or updates one or more display components constituting a confirmation screen in accordance with an instruction from a user. Confirmation screen creating unit 22 creates or updates the confirmation screen by disposing the display components created by display component creating unit 21 in accordance with an instruction from a user. Authorization unit 15 grants, to confirmation screen creating unit 22, narrower authority than to display component creating unit 21.

With this configuration, it is possible to easily create various confirmation screens corresponding to various applications by using display components, and at the same time, to set appropriate authority in accordance with the type of user to realize an excellent system that suppresses an increase in the processing load on database 133 side. In particular, by separating authority related to display component and authority related to confirmation screen, more effective authority setting can be realized.

In data visualization apparatus 101 according to the embodiment of the present disclosure, in processing unit 14, display processing unit 23 further performs processing for displaying a confirmation screen in accordance with an instruction from a user. Authorization unit 15 grants, to display processing unit 23, narrower authority than to confirmation screen creating unit 22.

With this configuration, since authority related to display component, authority related to confirmation screen, and authority related to screen viewing can be separated, more effective authority setting can be realized.

In data visualization apparatus 101 according to the embodiment of the present disclosure, the authority includes at least any one of authority to set a temporal range of the measurement data to be obtained from the database, authority to set a unit of time of the measurement data to be obtained from the database, or authority to set a type of calculation using the measurement data.

With the configuration in which such parameters are set, it is possible to effectively suppress an increase in the processing load on database 133 side.

In addition, in data visualization apparatus 101 according to the embodiment of the present disclosure, restriction unit 18 further limits at least one of a time taken to perform access processing once or the number of times of the access processing per certain time in a state in which the access processing by confirmation screen creating unit 22 is permitted.

With this configuration, the access processing is limited separately from the authority, and an increase in the processing load on database 133 side can be more reliably suppressed.

In data visualization apparatus 101 according to the embodiment of the present disclosure, restriction unit 18 makes a predetermined notification when a corresponding predetermined condition is satisfied by at least one of a time taken to perform access processing once or the number of times of the access processing per certain time.

With this configuration, it is possible to warn a user who is granted the authority for the access processing of an increase in the processing load on database 133 side.

In addition, in data visualization apparatus 101 according to the embodiment of the present disclosure, processing unit 14 further performs processing of displaying a time taken for the access processing on a confirmation screen.

With this configuration, a user who is granted the authority for the access processing can easily recognize the state of the processing load on database 133 side.

In the data processing method in data visualization apparatus 101 according to the embodiment of the present disclosure, first, target data that is at least one of measurement data obtained from database 133 in which the measurement data based on measurement results is accumulated or a calculation result using the measurement data in database 133 is obtained. Next, based on the obtained target data, processing of displaying the content related to the measurement data on the confirmation screen is performed. Then, a plurality of types of authority for access processing which is at least one of obtaining the measurement data from database 133 or calculation using measurement data in database 133 are set.

With this configuration, since various authority can be set for processing using database 133 in accordance with the type of user, it is possible to set appropriate authority in accordance with the type of user and to suppress an increase in the processing load on database 133 side.

Therefore, in the data processing method in data visualization apparatus 101 according to the embodiment of the present disclosure, the database can be used more smoothly in a configuration in which measurement data obtained from database 133 is visualized.

It should be understood that the above-described embodiments are illustrative in all aspects and should not be recognized as being restrictive. The scope of the present invention is defined by the scope of the claims rather than the above description, and is intended to embrace all the modifications within the meaning and range of equivalency of the claims.

The above description includes the following additional features.

[Supplementary Note 1]

A data visualization apparatus includes: a data obtaining unit configured to obtain target data that is at least one of measurement data obtained from a database in which the measurement data based on measurement results is accumulated or a calculation result using the measurement data in the database; a processing unit configured to performs process of displaying content related to the measurement data on a confirmation screen based on the target data obtained by the data obtaining unit; and an authorization unit configured to set a plurality of types of authority for access processing that is at least one of obtaining the measurement data from the database or calculation using the measurement data in the database, wherein the confirmation screen creating unit can select a content of the display component on the confirmation screen by setting the parameters in accordance with an instruction from a user.

REFERENCE SIGNS LIST

11 data obtaining unit
14 processing unit
15 authorization unit
16 input reception unit
17 storage unit
18 restriction unit
21 display component creating unit
22 confirmation screen creating unit
23 display processing unit
101 data visualization apparatus
131 display
132A, 132B server
133 database
134 network
201 management system

The invention claimed is:

1. A data visualization apparatus comprising:
circuitry configured to
obtain target data from a database and also to obtain identification information of a user, the target data being at least one of measurement data or a calculation result of calculation using the measurement data;
grant, based on the identification information of the user, authority to perform access processing to the circuitry, the access processing being at least one of processing of obtaining the measurement data from the database or processing of performing calculation using the measurement data in the database;
perform, based on the target data, processing of creating a confirmation screen including the measurement data or the calculation result and processing of causing a display to display the confirmation screen;
create or update, in accordance with an instruction from the user, one or more display components constituting the confirmation screen;
create or update, in accordance with a second instruction from the user, the confirmation screen by disposing the one or more display components created by the circuitry;
measure a time taken to perform the access processing once;
in a state in which the circuitry is granted the authority, limit the time taken to perform the access processing once; and
grant, based on the identification information of the user, different authorities to perform different combinations of one or more of different processes to the circuitry, the different processes including viewing the one or more display components, editing the one or more display components, creating the one or more display components, and creating the confirmation screen, wherein
each of the different authorities has a different combination as to which authority of the viewing, the editing, the creating of the one or more display components, and the creating of the confirmation screen is granted,
one of the different authorities is granted to the circuitry based on the identification information of the user, and
the circuitry is configured to measure the time taken to perform the access processing once by measuring a time from a reception of the target data to a completion of a creation of the confirmation screen.

2. The data visualization apparatus according to claim 1, wherein the circuitry grants, to the circuitry, second authority that allows the circuitry to obtain pieces of the target data.

3. The data visualization apparatus according to claim 2, wherein the circuitry is configured to perform processing of displaying the confirmation screen in accordance with a third instruction from the user, and
wherein the circuitry grants, to the circuitry, third authority that allows the circuitry to obtain second pieces of the target data.

4. The data visualization apparatus according claim 3, wherein the authority includes at least any one of authority to set a temporal range of the measurement data to be obtained from the database, authority to set a unit of time of the measurement data to be obtained from the database, or authority to set a type of calculation using the measurement data.

5. The data visualization apparatus according to claim 3, wherein the circuitry performs processing of further displaying a time taken for the access processing on the confirmation screen.

6. The data visualization apparatus according claim 2, wherein the authority includes at least any one of authority to set a temporal range of the measurement data to be obtained from the database, authority to set a unit of time of the measurement data to be obtained from the database, or authority to set a type of calculation using the measurement data.

7. The data visualization apparatus according to claim 2, wherein the circuitry performs processing of further displaying a time taken for the access processing on the confirmation screen.

8. The data visualization apparatus according to claim 1, wherein the authority includes at least any one of authority to set a temporal range of the measurement data to be obtained from the database, authority to set a unit of time of the measurement data to be obtained from the database, or authority to set a type of calculation using the measurement data.

9. The data visualization apparatus according to claim 8, wherein the circuitry performs processing of further displaying a time taken for the access processing on the confirmation screen.

10. The data visualization apparatus according to claim 1, wherein the circuitry makes a predetermined notification in response to a corresponding predetermined condition being satisfied by at least one of the time taken to perform the access processing once or the number of times of the access processing per certain time.

11. The data visualization apparatus according to claim 1, wherein the circuitry performs processing of further displaying a time taken for the access processing on the confirmation screen.

12. The data visualization apparatus according to claim 1, the circuitry is configured to limit the time taken to perform the access processing once.

13. The data visualization apparatus according to claim 1, the circuitry is configured to limit the number of times of the access processing per the certain time.

14. The data visualization apparatus according to claim 1, the circuitry is configured to limit the time taken to perform the access processing once and the number of times of the access processing per the certain time.

15. The data visualization apparatus according to claim 1, wherein
in a case where the identification information of the user indicates the user is a system administrator, a combination of authorities of the viewing, the editing, the creating of the one or more display components, and the creating of the confirmation screen is granted to the circuitry.

16. The data visualization apparatus according to claim 1, wherein
in a case where the identification information of the user indicates the user is a viewer, only an authority of the viewing is granted to the circuitry.

17. The data visualization apparatus according to claim 1, wherein
the circuitry is configured to obtain the target data from the database via a server, and
the circuitry is configured to measure the time taken to perform the access processing once by calculating a time between when the circuitry transmits a http post to the server and when the circuitry receives a http response from the server in response to the transmitted http post.

18. A data processing method for a data visualization apparatus, the data processing method comprising:
obtaining target data from a database and also obtaining identification information of a user, the target data being at least one of measurement data or a calculation result of calculation using the measurement data;
granting, based on the identification information of the user, authority to perform access processing to the data visualization apparatus, the access processing being at least one of processing of obtaining the measurement data from the database or processing of performing calculation using the measurement data in the database;
performing, based on the target data, processing of creating a confirmation screen including the measurement data or the calculation result and processing of causing a display to display the confirmation screen;
creating or updating, in accordance with an instruction from the user, one or more display components constituting the confirmation screen;
creating or updating, in accordance with a second instruction from the user, the confirmation screen by disposing the one or more display components;
measuring a time taken to perform the access processing once;
in a state in which the data visualization apparatus is granted the authority, limiting the time taken to perform the access processing once; and
granting, based on the identification information of the user, different authorities to perform different combinations of one or more of different processes to the data visualization apparatus, the different processes including viewing the one or more display components, editing the one or more display components, creating the one or more display components, and creating the confirmation screen, wherein each of the different authorities has a different combination as to which authority of the viewing, the editing, the creating of the one or more display components, and the creating of the confirmation screen is granted, one of the different authorities is granted based on the identification information of the user, and the data processing method further measures the time taken to perform the access processing once by measuring a time from a reception of the target data to a completion of a creation of the confirmation screen.

19. The data processing method according to claim 18, the data processing method further comprising:

obtaining the target data from the database via a server, and measuring the time taken to perform the access processing once by calculating a time between when a http post is transmitted to the server and when a http response is received from the server in response to the transmitted http post.

20. A non-transitory computer-readable storage medium storing a data processing program for causing a data visualization apparatus to execute instructions comprising:

obtaining target data from a database and also obtain identification information of a user, the target data being at least one of measurement data or a calculation result of calculation using the measurement data, granting, based on the identification information of the user, authority to perform access processing to the data visualization apparatus, the access processing being at least one of processing of obtaining the measurement data from the database or processing of performing calculation using the measurement data in the database;

performing, based on the target data, processing of creating a confirmation screen including the measurement data or the calculation result and processing of causing a display to display the confirmation screen;

creating or updating, in accordance with an instruction from the user, one or more display components constituting the confirmation screen;

creating or updating, in accordance with a second instruction from the user, the confirmation screen by disposing the one or more display components;

measuring a time taken to perform the access processing once;

in a state in which the data visualization apparatus is granted the authority, limiting the time taken to perform the access processing once; and granting, based on the identification information of the user, different authorities to perform different combinations of one or more of different processes to the data visualization apparatus, the different processes including viewing the one or more display components, editing the one or more display components, creating the one or more display components, and creating the confirmation screen, wherein each of the different authorities has a different combination as to which authority of the viewing, the editing, the creating of the one or more display components, and the creating of the confirmation screen is granted, one of the different authorities is granted based on the identification information of the user, and the data processing program further causing the data visualization apparatus to measure the time taken to perform the access processing once by measuring a time from a reception of the target data to a completion of a creation of the confirmation screen.

\* \* \* \* \*